(12) United States Patent
Zhang et al.

(10) Patent No.: US 12,463,789 B2
(45) Date of Patent: Nov. 4, 2025

(54) SUB-BAND FULL DUPLEX RESOURCE CONFIGURATION

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US); Junyi Li, Fairless Hills, PA (US); Abdelrahman Mohamed Ahmed Mohamed Ibrahim, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 543 days.

(21) Appl. No.: 17/811,493

(22) Filed: Jul. 8, 2022

(65) Prior Publication Data
US 2024/0014996 A1    Jan. 11, 2024

(51) Int. Cl.
*H04L 5/14* (2006.01)
*H04L 5/00* (2006.01)
*H04W 72/0446* (2023.01)
*H04W 72/1273* (2023.01)
*H04W 72/23* (2023.01)

(52) U.S. Cl.
CPC .......... *H04L 5/1469* (2013.01); *H04L 5/0053* (2013.01); *H04L 5/0092* (2013.01); *H04L 5/0094* (2013.01); *H04L 5/14* (2013.01); *H04L 5/1461* (2013.01); *H04W 72/0446* (2013.01); *H04W 72/1273* (2013.01); *H04W 72/23* (2023.01)

(58) Field of Classification Search
CPC ... H04L 5/1469; H04L 5/0092; H04L 5/0094; H04L 5/14; H04L 5/1461; H04L 5/0053; H04W 72/1273; H04W 72/23; H04W 72/0446
See application file for complete search history.

(56) References Cited

U.S. PATENT DOCUMENTS

2017/0346616 A1 * 11/2017 Liu ................. H04L 5/0044
2019/0364558 A1 * 11/2019 Kim ................ H04L 5/0053
(Continued)

OTHER PUBLICATIONS

International Search Report and Written Opinion—PCT/US2023/020022—ISA/EPO—Sep. 4, 2023.
(Continued)

*Primary Examiner* — Brian J. Gillis
*Assistant Examiner* — Chhian (Amy) Ling
(74) *Attorney, Agent, or Firm* — Harrity & Harrity, LLP

(57) ABSTRACT

Various aspects of the present disclosure generally relate to wireless communication. In some aspects, a network node may output a first configuration for a set of resources, the first configuration being associated with a time division duplexing pattern, and the first configuration configuring the set of resources to one of an uplink format, a downlink format, or a flexible format. The network node may output a second configuration configuring one or more resources, of the set of resources, to a sub-band full duplex (SBFD) format based at least in part on the one or more resources satisfying a condition. Numerous other aspects are described.

30 Claims, 11 Drawing Sheets

(56) References Cited

U.S. PATENT DOCUMENTS

| | | | |
|---|---|---|---|
| 2021/0135833 A1* | 5/2021 | Hao | H04L 5/0023 |
| 2021/0352667 A1 | 11/2021 | Abotabl et al. | |
| 2021/0377926 A1 | 12/2021 | Li et al. | |
| 2023/0076137 A1* | 3/2023 | Cozzo | H04L 5/0048 |
| 2023/0163937 A1* | 5/2023 | Awadin | H04L 5/14 |
| | | | 370/329 |
| 2023/0354321 A1* | 11/2023 | Chen | H04L 5/0094 |
| 2025/0016753 A1* | 1/2025 | Ma | H04L 5/14 |

OTHER PUBLICATIONS

Nokia., et al., "On Subband Non-Overlapping Full Duplex for NR", 3GPP TSG RAN WG1 #110bis-e, R1-2210042, 3rd Generation Partnership Project (3GPP), Mobile Competence Centre, 650, Route Des Lucioles, F-06921, Sophia-Antipolis Cedex, France, vol. RAN WG1, No. e-meeting, Oct. 10, 2022-Oct. 19, 2022, Sep. 30, 2022, 22 Pages, XP052259513, Sect. 2.3.4.

\* cited by examiner

SUB-BAND FULL DUPLEX RESOURCE CONFIGURATION

FIELD OF THE DISCLOSURE

Aspects of the present disclosure generally relate to wireless communication and to techniques and apparatuses for sub-band full duplex (SBFD) resource configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include outputting a first configuration for a set of resources, the first configuration being associated with a time division duplexing pattern, and the first configuration configuring the set of resources to one of an uplink format, a downlink format, or a flexible format. The method may include outputting a second configuration configuring one or more resources, of the set of resources, to a sub-band full duplex (SBFD) format based at least in part on the one or more resources satisfying a condition.

Some aspects described herein relate to a method of wireless communication performed by a user equipment (UE). The method may include receiving a first configuration for a set of resources, the first configuration being associated with a time division duplexing pattern, and the first configuration configuring the set of resources to one of an uplink format, a downlink format, or a flexible format. The method may include receiving a second configuration configuring one or more resources, of the set of resources, to an SBFD format based at least in part on the one or more resources satisfying a condition associated with configuring the one or more resources to the SBFD format. The method may include communicating on the one or more resources.

Some aspects described herein relate to a network node for wireless communication. The network node may include a memory and one or more processors coupled to the memory. The one or more processors may be configured to output a first configuration for a set of resources, the first configuration being associated with a time division duplexing pattern, and the first configuration configuring the set of resources to one of an uplink format, a downlink format, or a flexible format. The one or more processors may be configured to output a second configuration configuring one or more resources, of the set of resources, to an SBFD format based at least in part on the one or more resources satisfying a condition.

Some aspects described herein relate to a UE for wireless communication. The UE may include a memory and one or more processors coupled to the memory. The one or more processors may be configured to receive a first configuration for a set of resources, the first configuration being associated with a time division duplexing pattern, and the first configuration configuring the set of resources to one of an uplink format, a downlink format, or a flexible format. The one or more processors may be configured to receive a second configuration configuring one or more resources, of the set of resources, to an SBFD format based at least in part on the one or more resources satisfying a condition associated with configuring the one or more resources to the SBFD format. The one or more processors may be configured to communicate on the one or more resources.

Some aspects described herein relate to a non-transitory computer-readable medium that stores a set of instructions for wireless communication by a network node. The set of instructions, when executed by one or more processors of the network node, may cause the network node to output a first configuration for a set of resources, the first configuration being associated with a time division duplexing pattern, and the first configuration configuring the set of resources to one of an uplink format, a downlink format, or a flexible format. The set of instructions, when executed by one or more processors of the network node, may cause the network node to output a second configuration configuring one or more resources, of the set of resources, to an SBFD format based at least in part on the one or more resources satisfying a condition.

Some aspects described herein relate to a non-transitory computer-readable medium that stores a set of instructions for wireless communication by a UE. The set of instructions, when executed by one or more processors of the UE, may cause the UE to receive a first configuration for a set of resources, the first configuration being associated with a time division duplexing pattern, and the first configuration configuring the set of resources to one of an uplink format, a downlink format, or a flexible format. The set of instructions, when executed by one or more processors of the UE, may cause the UE to receive a second configuration configuring one or more resources, of the set of resources, to an SBFD format based at least in part on the one or more resources satisfying a condition associated with configuring the one or more resources to the SBFD format. The set of instructions, when executed by one or more processors of the UE, may cause the UE to communicate on the one or more resources.

Some aspects described herein relate to an apparatus for wireless communication. The apparatus may include means for outputting a first configuration for a set of resources, the first configuration being associated with a time division duplexing pattern, and the first configuration configuring the set of resources to one of an uplink format, a downlink format, or a flexible format. The apparatus may include means for outputting a second configuration configuring one or more resources, of the set of resources, to an SBFD format based at least in part on the one or more resources satisfying a condition.

Some aspects described herein relate to an apparatus for wireless communication. The apparatus may include means for receiving a first configuration for a set of resources, the first configuration being associated with a time division duplexing pattern, and the first configuration configuring the set of resources to one of an uplink format, a downlink format, or a flexible format. The apparatus may include means for receiving a second configuration configuring one or more resources, of the set of resources, to an SBFD format based at least in part on the one or more resources satisfying a condition associated with configuring the one or more resources to the SBFD format. The apparatus may include means for communicating on the one or more resources.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
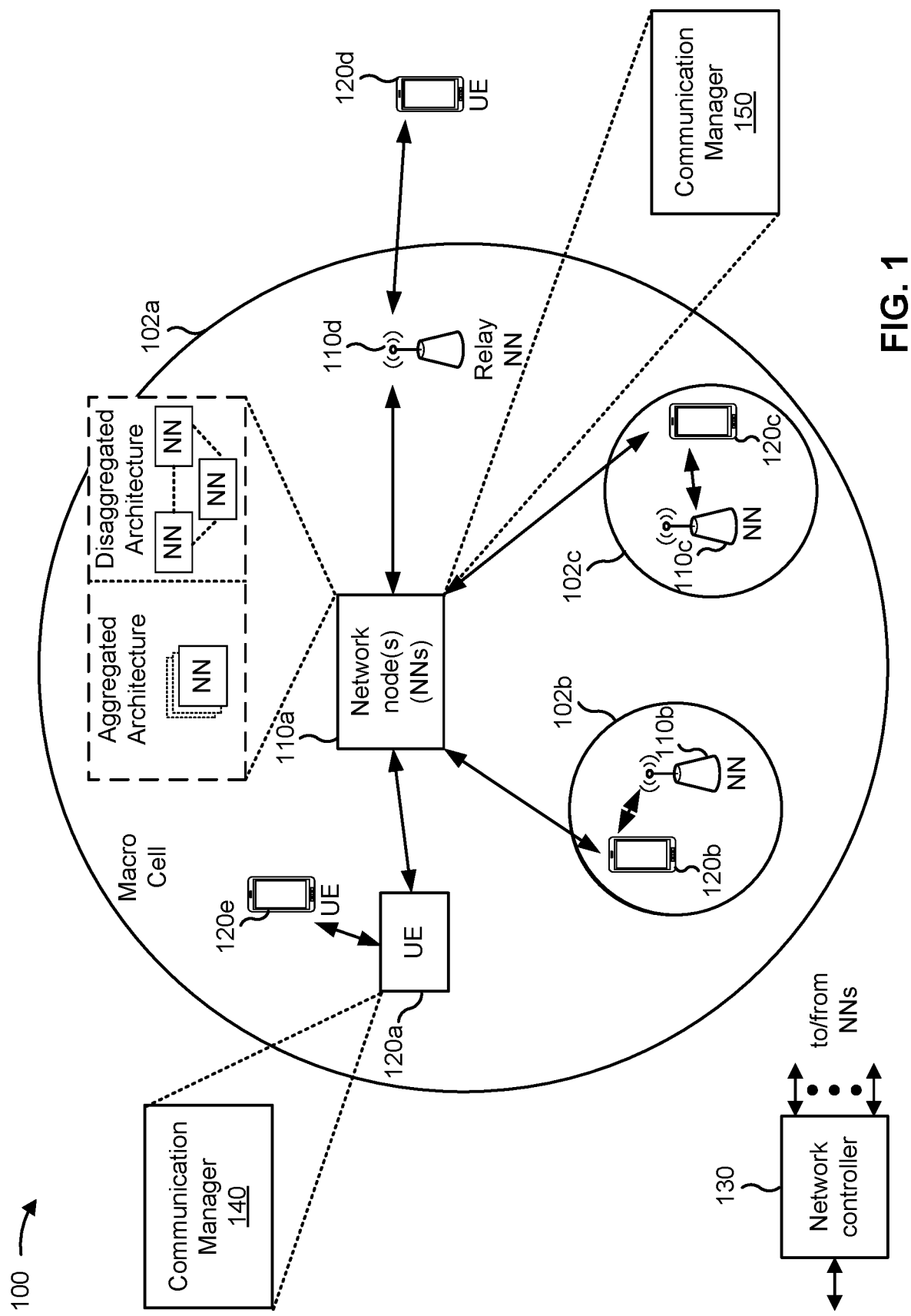
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node 110 may include a communication manager 150. As described in more detail elsewhere herein, the communication manager 150 may output a first configuration for a set of resources, the first configuration being associated with a time division duplexing pattern, and the first configuration configuring the set of resources to one of an uplink format, a downlink format, or a flexible format; and output a second configuration configuring one or more resources, of the set of resources, to an SBFD format based at least in part on the one or more resources satisfying a condition. Additionally, or alternatively, the communication manager 150 may perform one or more other operations described herein.

In some aspects, the UE 120 may include a communication manager 140. As described in more detail elsewhere herein, the communication manager 140 may receive a first configuration for a set of resources, the first configuration being associated with a time division duplexing pattern, and the first configuration configuring the set of resources to one of an uplink format, a downlink format, or a flexible format; receive a second configuration configuring one or more resources, of the set of resources, to an SBFD format based at least in part on the one or more resources satisfying a condition associated with configuring the one or more resources to the SBFD format; and communicate on the one or more resources. Additionally, or alternatively, the communication manager 140 may perform one or more other operations described herein.

As indicated above, FIG. 1 is provided as an example. Other examples may differ from what is described with regard to FIG. 1.

Figure 2:
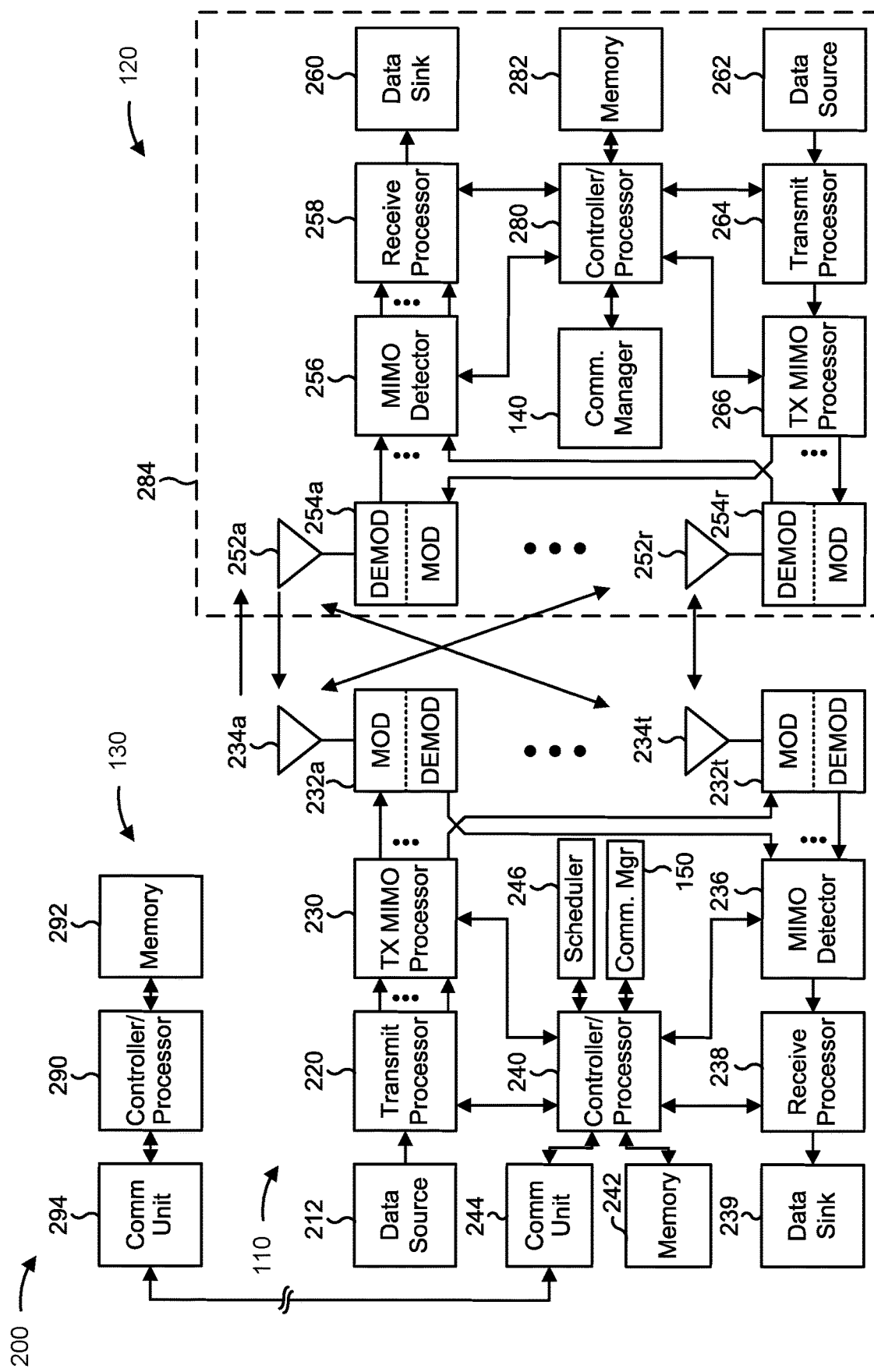
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1).

The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream.

Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the network node 110, the controller/processor 280 of the UE 120, and/or any other component(s) of FIG. 2 may perform one or more techniques associated with resource configuration, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a network node (e.g., the network node 110) includes means for outputting a first configuration for a set of resources, the first configuration being associated with a time division duplexing pattern, and the first configuration configuring the set of resources to one of an uplink format, a downlink format, or a flexible format; and/or means for outputting a second configuration configuring one or more resources, of the set of resources, to a sub-band full duplex (SBFD) format based at least in part on the one or more resources satisfying a condition. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., the UE 120) includes means for receiving a first configuration for a set of resources, the first configuration being associated with a time division duplexing pattern, and the first configuration configuring the set of resources to one of an uplink format, a downlink format, or a flexible format; means for receiving a second configuration configuring one or more resources, of the set of resources, to an SBFD format based at least in part on the one or more resources satisfying a condition associated with configuring the one or more resources to the SBFD format; and/or means for communicating on the one or more resources. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
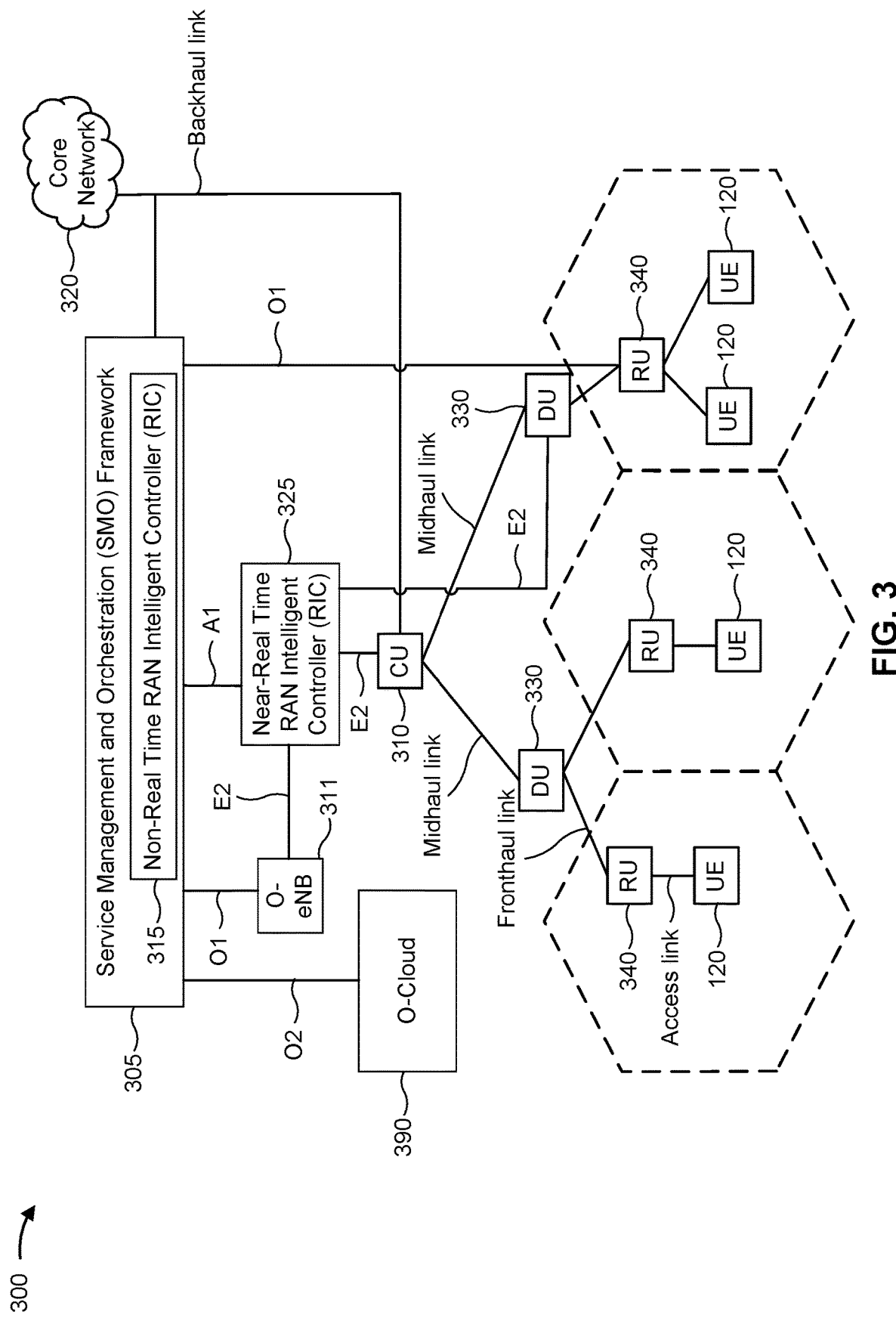
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIGS. 4A-4D are diagrams illustrating examples 400, 410, 420, 430 of full duplex (FD) communication in accordance with the present disclosure. An FD communication is a communication that utilizes overlapped time resources at a single node (such as a UE or a base station) for transmission and reception. For example, a UE or a network node may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indicator (TCI) states defining different beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG).

Figure 4A:
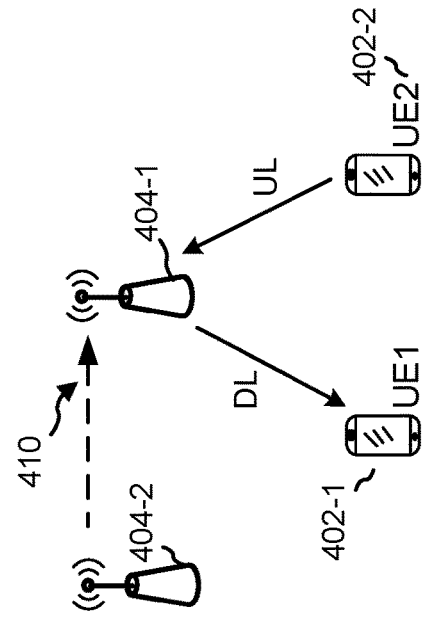
FIGS. 4A-4D are diagrams illustrating examples of full duplex communication in accordance with the present disclosure.

The example 400 of FIG. 4A includes a UE1 402 and two network nodes (e.g., TRPs) 404-1, 404-2, wherein the UE1 402 is sending uplink transmissions to the network node 404-1 and is receiving downlink transmissions from the network node 404-2. In some aspects, the network node 404 described in connection with FIG. 4 may be a base station, a TRP associated with (e.g., managed by) a network node, an RU, a DU, or a similar network node. In some aspects, the UEs 402 described in connection with FIG. 4 may be the UE 120 described in connection with FIGS. 1, 2, and 3, or a similar UE. In the example 400 of FIG. 4A, FD is enabled for the UE1 402, but not for the network nodes 404-1, 404-2. Thus, the network nodes 404-1 and 404-2 are half duplex (HD) network nodes.

Figure 4B:
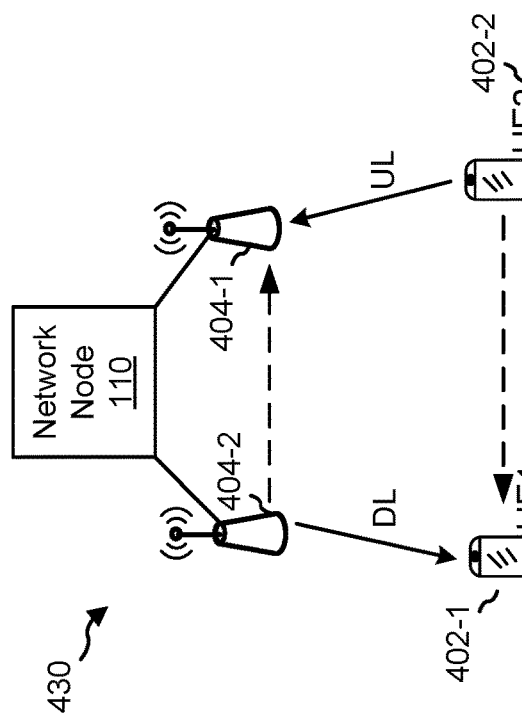

The example 410 of FIG. 4B includes two UEs, UE1 402-1 and UE2 402-2, a network node 404-1, and a network node 404-2. The UE1 402-1 is receiving a downlink transmission from the network node 404-1 and the UE2 402-2 is transmitting an uplink transmission to the network node 404-1. In the example 410 of FIG. 4B, FD is enabled for the network node 404-1, but not for the UE1 402-1 and UE2 402-2. Thus, the UE1 402-1 and UE2 402-2 are half duplex UEs.

Figure 4C:
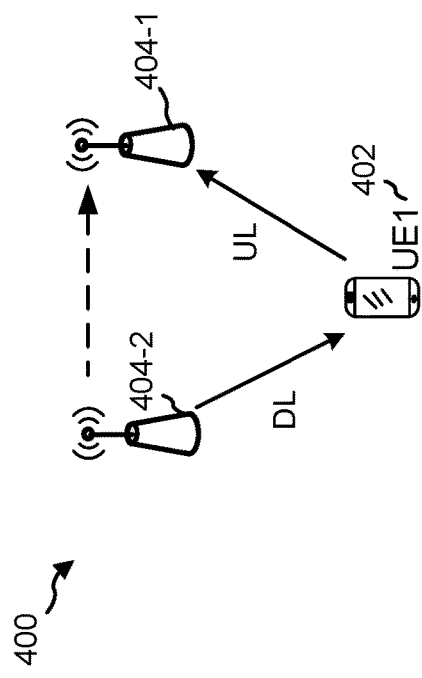
Figure 4D:
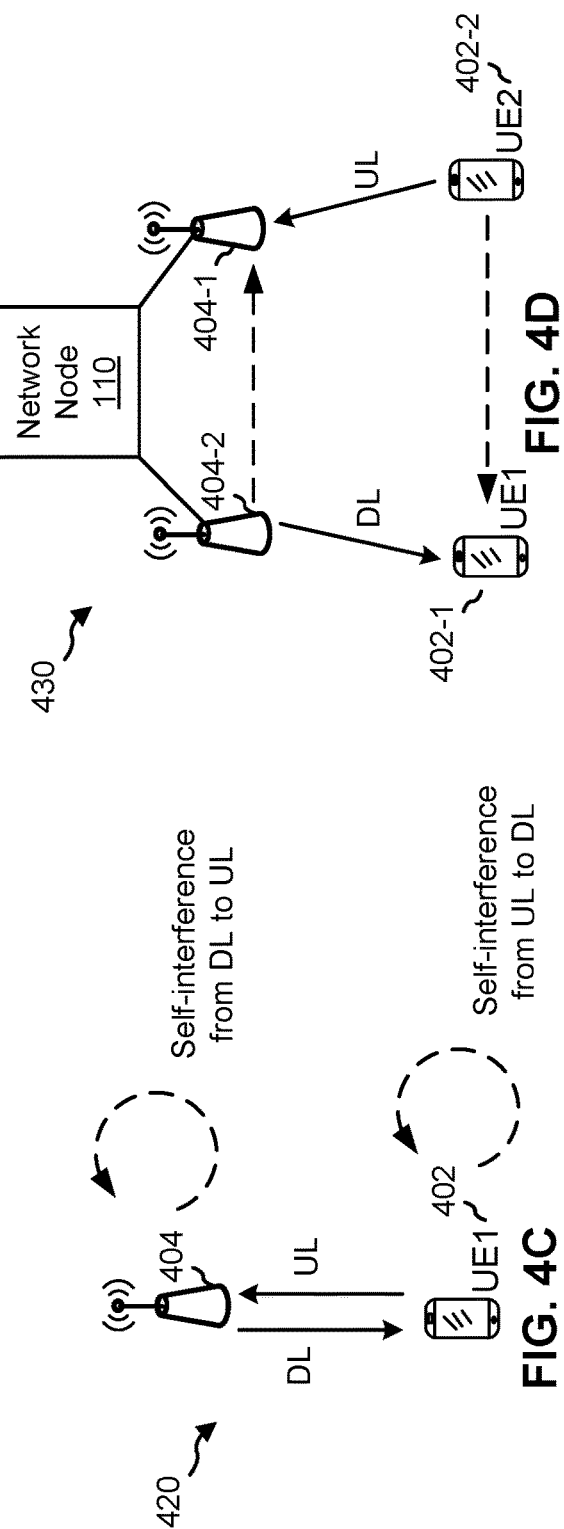

The example 420 of FIG. 4C includes a UE1 402 and a network node 404, wherein the UE1 402 is receiving a downlink transmission from the network node 404 and the UE1 402 is transmitting an uplink transmission to the network node 404. In the example 420 of FIG. 4C, FD is enabled for both the UE1 402 and the network node 404. In the example 420 of FIG. 4C, the UE1 402 and the network node 404 communicate using a beam pair. A beam pair may include a downlink beam and an uplink beam. For example, a UE1 402 may use a beam pair that includes a downlink beam (that is, a receive beam) at the UE1 402 and an uplink beam (that is, a transmit beam) at the UE1 402 to communicate with the network node 404. The network node 404 may use a downlink beam (that is, a transmit beam) at the network node 404 to transmit communications received via the UE1 402's downlink beam, and may use an uplink beam (that is, a receive beam) at the network node 404 to receive communications transmitted via the UE1 402's uplink beam.

The example 430 of FIG. 4C includes a network node 110 and two network nodes 404-1 and 404-2 associated with a cell (such as, e.g., a cell 102 described in connection with FIG. 1). The network nodes 404-1 and 404-2 may be either co-located (e.g., located at the same device, such as at the network node 110 or other device), or may be non-co-located (e.g., located apart from one another and/or from the network node 110, and thus may be standalone devices).

In FIGS. 4A-4D, interference is indicated by dashed lines. Interference can occur between network nodes of examples 400, 410, 420, 430 (referred to as cross-link interference (CLI)). In FIG. 4A, network node 404-2's downlink transmission interferes with network node 404-1's uplink transmission. In FIG. 4B, network node 404-1's uplink reception may be subject to interference from a transmission by a network node 404-2. CLI between network nodes 404 is referred to herein as inter-network node CLI. In some examples in FIG. 4B, UE2 402-2's uplink transmission may interfere with UE1 402-1's downlink transmission (not shown). Similarly, in FIG. 4D, UE2 402-2's uplink transmission interferes with UE1 402-1's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 402 (from an uplink transmission to a downlink reception) and at a network node 404 (from a downlink transmission to an uplink reception) are shown in FIG. 4C. It should be noted that the above-described CLI and self-interference conditions can occur in HD deployments and in FD deployments.

Some network nodes support sub-band full duplex (SBFD) communication, as described below. SBFD communication may involve the configuration of certain resources as having an SBFD format. Some techniques described herein provide rules (e.g., conditions) for which resources can or cannot be configured to have an SBFD format, whether a resource with a particular format can be reconfigured to have another format, and/or whether communications of a UE that does not support SBFD communication can be configured in an SBFD slot, as described elsewhere herein.

As indicated above, FIGS. 4A-4D are provided as one or more examples. Other examples may differ from what is described with regard to FIGS. 4A-4D.

Figure 5:
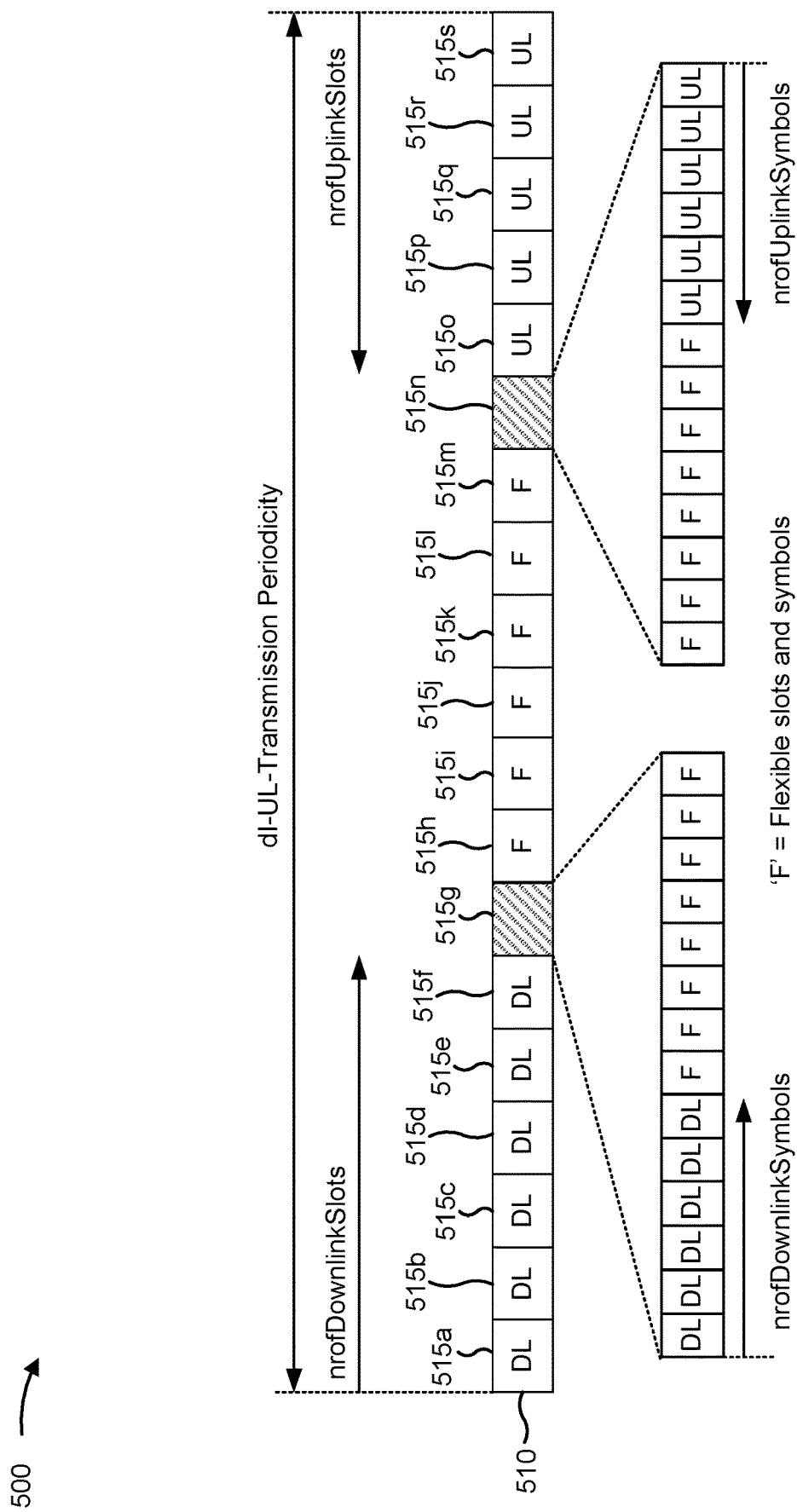
FIG. 5 is a diagram illustrating an example of a slot format used to schedule UE communications, in accordance with the present disclosure.

FIG. 5 is a diagram illustrating an example 500 of a slot format used to schedule UE communications, in accordance with the present disclosure. As described above, a transmission timeline may be organized into radio frames, subframes, slots, and symbols. However, for ease of description, only the slot and symbol granularity are depicted in FIG. 5. Example 500 shows how time division duplexed (TDD) slots (e.g., slots on a TDD carrier) can be configured as usable for uplink and/or downlink communication using a combination of semi-static and dynamic signaling.

A timeline of slots is shown by reference number 510, which includes a number of slots 515*a*-515*s*. Each slot 515 and/or portions thereof (e.g., symbols) may be scheduled and/or configured for use for an uplink ("UL") communication, a downlink ("DL") communication, or as flexible ("F"). A flexible slot (e.g., 515*h*-515*m*) may be used for either an uplink communication or a downlink communication. A resource configured and/or scheduled for use for an uplink communication is described herein as having an uplink (U) format. A resource configured and/or scheduled for use for a downlink communication is described herein as having a downlink (D) format. A resource configured and/or scheduled to include only flexible resources is described herein as having a flexible (F) format. All symbols within each slot may all be assigned alike (e.g., all "UL," all "DL," or all "F"), or else the slot may include multiple symbol assignment types. For example, in FIG. 5, slots 515*a*-515*f* (denoted by "nrofDownlinkSlots") are depicted as downlink slots without showing the symbol granularity because all symbols in each of those slots are configured as downlink symbols. Similarly, slots 515*o*-515*s* (denoted by "nrofUplinkSlots") are depicted as uplink slots without showing the symbol granularity because all symbols in each of those slots are configured as uplink symbols. In this regard, "nrofDownlinkSlots" refers to the number of consecutive full DL slots (e.g., slots including only DL symbols) at the beginning of each timeline of slots 510 (e.g., slots 515*a*-515*f*), and "nrofUplinkSlots" refers to the number of consecutive full UL slots (e.g., slots including only UL symbols) at the end of each timeline of slots 510 (e.g., slots 515*o*-515*s*).

Slots 515*g* and 515*n* include more than one format of symbols. More particularly, slot 515*g* includes six downlink symbols (denoted by "nrofDownlinkSymbols"), with the remaining eight symbols being flexible and thus available for uplink or downlink, for a total of fourteen symbols. Slot 515*n* includes six uplink symbols (denoted by "nrofUplinkSymbols"), with the remaining eight symbols being flexible and thus available for uplink or downlink, again for a total of fourteen symbols. In this regard, "nrofDownlinkSymbols" refers to the number of consecutive DL symbols in the beginning of the slot 515*g* following the last full DL slot 515*f*, and "nrofUplinkSymbols" refers to the number of consecutive UL symbols in the end of the slot 515*n* preceding the first full UL slot 515*o*. The remaining slots in the timeline of slots 510 (e.g., slots 515*h*-515*m*) are flexible (e.g., full flexible, with all symbols in these slots being configured as flexible symbols), and thus available for uplink and downlink communication.

Resources (e.g., slots and/or symbols) semi-statically configured as flexible may be later reconfigured for use for uplink or downlink communication. In some aspects, a common configuration parameter (e.g., tdd-UL-DL-ConfigurationCommon or similar) transmitted to all UEs in a cell defines a semi-static slot and/or symbol structure, including designating certain slots or symbols for use in uplink communication, downlink communication, or as flexible for use in either uplink or downlink communication. For example, the common configuration parameter may semi-statically configure slots and symbols to have an initial configuration as shown in FIG. 5. A dedicated configuration parameter (e.g., tdd-UL-DL-ConfigurationDedicated), which can be transmitted to a specific UE via a slot format indicator (SFI), may then be used to reconfigure the flexible slots and symbols as uplink or downlink slots and symbols. In some cases, for a remaining flexible slot or symbol (e.g., slots or symbols still configured as flexible after the reconfiguration due to the dedicated configuration parameter), the UE may monitor for physical downlink control channel (PDCCH) information, and determine whether a flexible slot or symbol should be configured as an uplink slot or symbol or a downlink slot or symbol based at least in part on an uplink and/or downlink resource allocation indicated by the PDCCH information. In some cases, the flexible slots or symbols may be dynamically changed by the network node via a DCI message or a similar message (which may be referred to as a UE-dedicated configuration).

Resources (e.g., slots and/or symbols) can be configured to have an SBFD format. A resource having an SBFD format includes one or more SBFD symbols. An SBFD symbol is a symbol with one or more sub-bands (referred to herein as SBFD sub-bands) that a network node (such as a gNB) can use or will use for SBFD operation. For SBFD operation within a TDD carrier, an SBFD sub-band may include 1 resource block, or a set of consecutive resource blocks, for a same transmission direction. In some aspects, for SBFD operation within a TDD carrier, an SBFD sub-band consists of 1 resource block, or a set of consecutive resource blocks, for a same transmission direction. In some aspects, "SBFD symbols" are defined as symbols with subbands that a gNB would use for SBFD operation. In some aspects, for SBFD operation within a TDD carrier, a SBFD subband consists of 1 resource block (RB) or a set of consecutive RBs for the same transmission direction. Additional description of SBFD resources is provided in connection with FIG. 6. The techniques described herein provide rules (e.g., conditions) for reconfiguring resources and/or sub-bands between the downlink format, the uplink format, the flexible format, and the SBFD format.

As indicated above, FIG. 5 is provided as an example. Other examples may differ from what is described with regard to FIG. 5.

Figure 6:
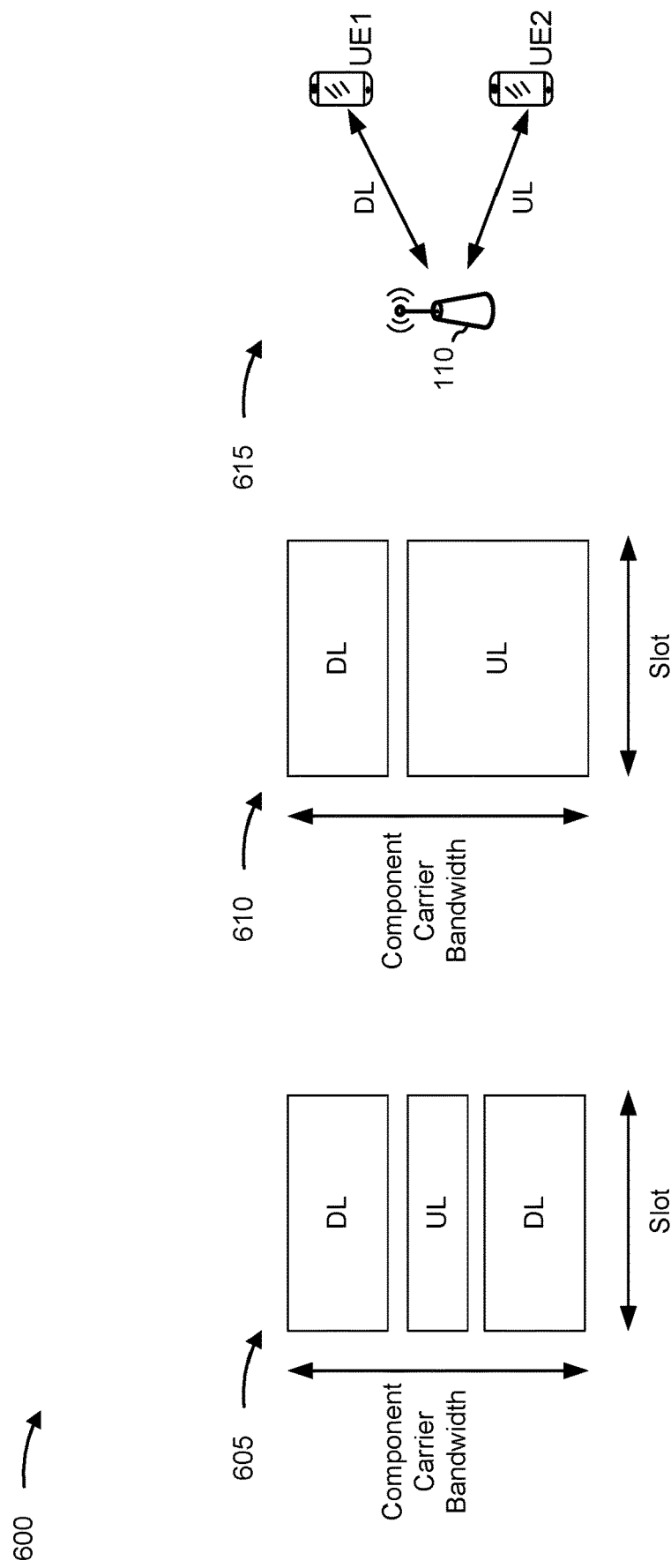
FIG. 6 is a diagram illustrating an example of sub-band full duplex (SBFD) resources and communication, in accordance with the present disclosure.

FIG. 6 is a diagram illustrating an example 600 of SBFD resources and communication, in accordance with the present disclosure. FIG. 6 shows examples 605 and 610 of SBFD resources, and an example 615 of a communication configuration between a network node 110 and UEs 1 and 2 (e.g., UEs 120) using an SBFD configuration.

An SBFD resource (that is, a resource having an SBFD format) may include one or more symbols and/or one or more slots. As mentioned above, an SBFD resource may include at least one uplink sub-band (that is, a sub-band used for uplink communication by a UE) and at least one downlink sub-band (that is, a sub-band used for downlink communication by a UE). Example 605 includes two non-contiguous downlink sub-bands and one uplink sub-band. Example 610 includes one downlink sub-band and one uplink sub-band. The two downlink sub-bands of example 605 may be used by a single UE, or may be used by different UEs (e.g., a first UE for a first downlink sub-band and a second UE for a second downlink sub-band). As mentioned above, a sub-band may include one or multiple consecutive resource blocks associated with a transmission direction. Here, example 605 includes two sub-bands associated with a downlink transmission direction and one sub-band associated with an uplink transmission direction, and example 610 includes one sub-band associated with a downlink transmission direction and one sub-band associated with an uplink transmission direction. Examples 605 and 610 may illustrate a symbol having an SBFD format (e.g., a symbol in which there is a set of resource blocks comprising at least one downlink sub-band and a set of resource blocks comprising at least one uplink sub-band), a slot having an SBFD format (e.g., a slot in which there is at least one downlink sub-band and at least one uplink sub-band), or another time resource having an SBFD format.

In a resource with an SBFD format, a network node 110 may perform simultaneous transmission of downlink transmissions and reception of uplink transmissions on a sub-band basis. For example, the network node 110 may simultaneously communicate with UE1 on the downlink and UE2 on the uplink. In some examples, UE1 and/or UE2 may be configured with only the sub-band(s) in use by UE1 and/or UE2 for communication. For example, UE1 may be configured with only downlink sub-bands, and UE2 may be configured with only uplink sub-bands of an SBFD formatted resource. This may be because, for example, UE1 and/or UE2 do not have a capability for SBFD communication. In some examples, UE1 and/or UE2 may be configured to utilize an SBFD formatted resource. For example, if a UE has a capability for SBFD communication, the UE may be aware that a given resource has an SBFD format (while utilizing the resource in only one transmission direction), or may perform FD communication in the given resource.

A resource can be configured to an SBFD format. In some aspects, a resource may be configured to an SBFD format based at least in part on an indication of a change of a format of the resource. For example, a network node may provide signaling indicating that the format of the resource is selected as an SBFD format (similarly to how signaling may indicate that the format is an uplink format, a downlink format, or a flexible format). As another example, a network node may configure one or more sub-bands of the resource such that the resource includes at least one uplink sub-band and at least one downlink sub-band. For example, a network node may reconfigure a sub-band of a slot with a downlink format to be an uplink sub-band, thereby converting the slot to have an SBFD format.

SBFD communication may provide an increased uplink duty cycle (relative to full-band communication), leading to latency reduction (since it is possible to receive downlink signaling in uplink slots) and uplink coverage improvement. Furthermore, SBFD communication may provide enhanced system capacity, resource utilization, and spectral efficiency. Still further, SBFD communication may enable flexible and dynamic uplink/downlink resource adaptation according to uplink/downlink traffic in a robust manner.

As indicated above, FIG. 6 is provided as an example. Other examples may differ from what is described with regard to FIG. 6.

A network node may configure a format of a set of resources (such as slots or symbols), as described above. For example, a network node may configure a resource to have an uplink format, a downlink format, a flexible format, or an SBFD format. In some circumstances, it may be beneficial for a network node to reconfigure the format of a resource of the set of resources, such as from a first format (selected from the downlink format, the uplink format, the flexible format, or the SBFD format) to a second, different format (selected from the downlink format, the uplink format, the flexible format, or the SBFD format). It may also be beneficial in some circumstances to reconfigure one or more sub-bands of a resource. However, there are situations where reconfiguring the format associated with a resource, or the sub-bands associated with the resource, may be detrimental to the operation of the network. For example, if a downlink or flexible resource is reconfigured to an SBFD or uplink format, the transmission of some downlink channels or symbols may be negatively impacted. As another example, if an uplink resource is reconfigured to an SBFD or downlink format, the transmission of some uplink transmissions may be negatively impacted. Furthermore, it may be beneficial to reconfigure a resource or sub-band from an SBFD format to another format, such as a downlink format or sub-band, an uplink format or sub-band, or a flexible format or sub-band. However, it may be detrimental to communication operations of the network to reconfigure a resource or sub-band from the SBFD format to a non-SBFD format. Reconfiguring formats of resources and/or sub-band without regard for the detrimental consequences of the reconfiguration may lead to decreased network throughput, reduced reliability, and decreased efficiency of communication.

Some techniques described herein provide conditions (e.g., rules) for configuration of a format associated with a resource (such as one or more slots or one or more symbols). In some aspects, a condition may relate to whether a resource with a downlink or flexible format can be reconfigured to an SBFD format (that is, to include an uplink sub-band). In some aspects, a condition may relate to whether a resource with an uplink format can be reconfigured to an SBFD format (that is, to include a downlink sub-band). In some aspects, a condition may relate to whether a legacy UE (that is, a UE without an SBFD capability) can be scheduled to transmit uplink communications and/or receive downlink communications in an SBFD resource. In some aspects, a condition may relate to whether an SBFD resource can be configured to fall back to a downlink format, an uplink format, and/or a flexible format. In some aspects, a condition may relate to whether a sub-band of an SBFD resource can be converted to a different format. Thus, system operation may define resources that can be configured as SBFD resources. By providing conditions for reconfiguring resources between different formats related to SBFD communication, network throughput is improved, reliability is improved, and efficiency of communication is improved.

Figure 7:
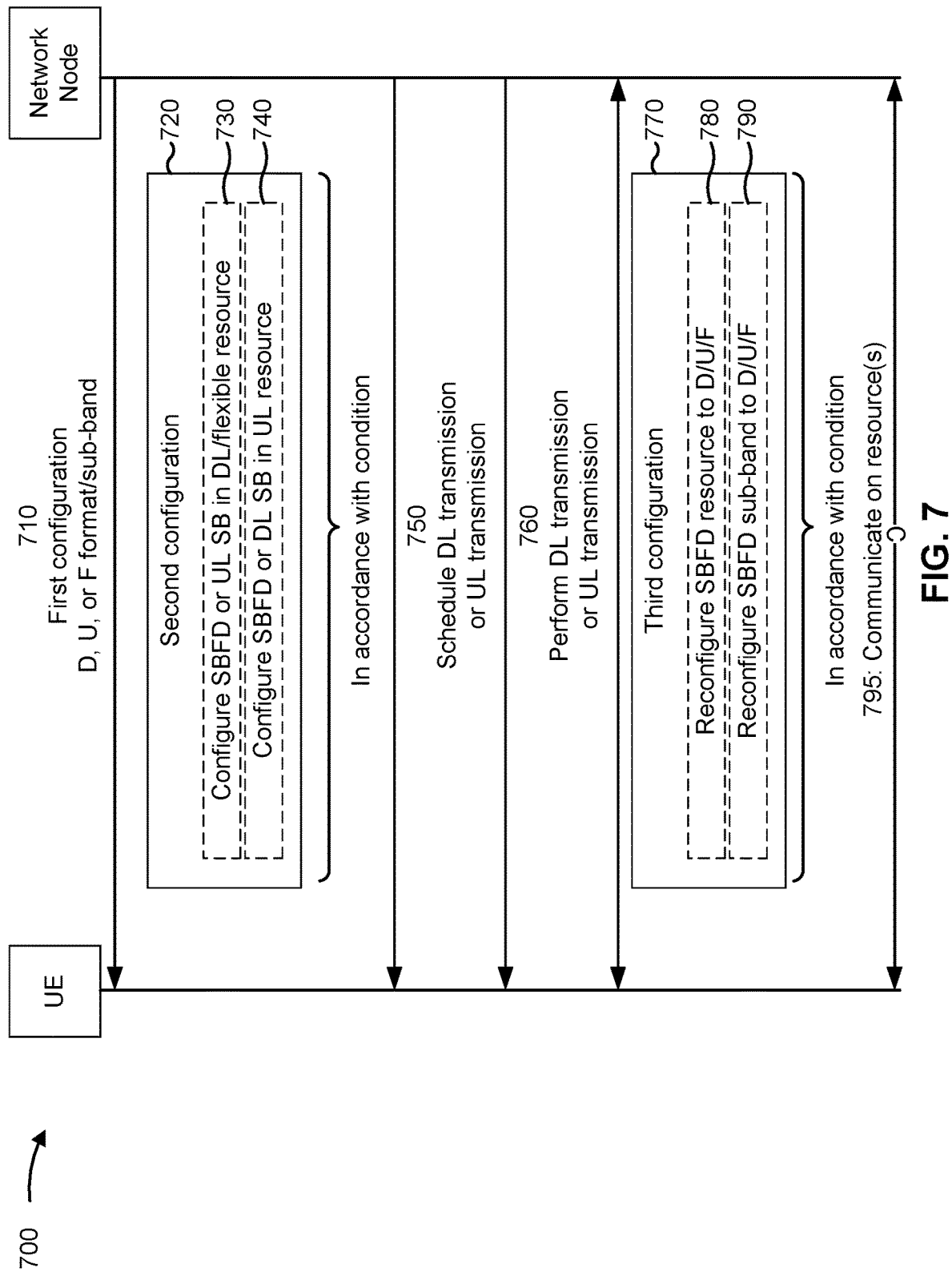
FIG. 7 is a diagram illustrating an example of signaling associated with reconfiguring a resource, in accordance with the present disclosure.

FIG. 7 is a diagram illustrating an example 700 of signaling associated with reconfiguring a resource, in accordance with the present disclosure. Example 700 includes a UE (e.g., UE 120) and a network node (e.g., network node 110). In some aspects, the network node may include multiple network nodes, such as one or more CUs, one or more DUs, and/or one or more RUs. Operations described as being performed by the network node may be performed by one of the multiple network nodes.

As shown in FIG. 7, and by reference number 710, the network node may output a first configuration for a set of resources. For example, the network node may transmit, and the UE may receive, the first configuration. As another example, the network node may output the first configuration for transmission (e.g., by an RU) to the UE. The first configuration may be associated with a TDD pattern. For example, the first configuration may include a common configuration parameter and/or a dedicated configuration parameter for a TDD pattern, as described in connection with FIG. 5. In some aspects, the first configuration may be a cell common configuration (that is, a common configuration parameter). In some aspects, the first configuration may include an SFI (that is, a dedicated configuration parameter). In some aspects, the first configuration may include a UE-dedicated configuration. The first configuration may configure the set of resources to an uplink format, a downlink format, or a flexible format. For example, a full bandwidth of the set of resources may be configured to one of the uplink format, the downlink format, or the flexible format. The set of resources may include one or more time resources, such as one or more slots, one or more symbols, or a combination thereof.

As shown by reference number 720, the network node may output a second configuration configuring one or more resources, of the set of resources, to an SBFD format. The second configuration may configure the one or more resources (e.g., one or more slots, one or more symbols, or a combination thereof) to the SBFD format based at least in part on the one or more resources satisfying a condition. The condition may define one or more rules for reconfiguring a resource or a sub-band of a resource from a first format (or sub-band) to a second format (or sub-band). In some aspects, the condition may indicate one or more formats or sub-bands to which a resource can be reconfigured, based at least in part on an original (e.g., prior to reconfiguration) format or sub-band of the resource. In some aspects, the condition may indicate one or more formats or sub-bands to which a resource cannot be reconfigured, based at least in part on an original (e.g., prior to reconfiguration) format or sub-band of the resource. In some aspects, the condition may indicate one or more formats or sub-bands to which a resource can or cannot be reconfigured, based at least in part on whether the resource is associated with a restricted use. Particular examples of the condition are provided in connection with reference numbers 730, 740, 780, and 790.

As shown by reference number 730, in some aspects, the second configuration may configure an SBFD format in a resource with a downlink format or a flexible format. For example, the second configuration may explicitly change the resource's format to an SBFD format, or may configure an uplink sub-band in the resource. For example, the second configuration may configure the SBFD format or the uplink sub-band in accordance with the condition. In some aspects, the condition indicates that any resource configured in the flexible format or the downlink format can be configured to the SBFD format. For example, an SBFD format or an uplink sub-band may be allowed to be configured in all downlink symbols or slots and all flexible symbols or slots.

In some aspects, the condition indicates that resources configured in the flexible format or the downlink format, and not associated with a restricted use, can be configured to the SBFD format. For example, an SBFD format or an uplink sub-band may be allowed to be configured in downlink symbols or slots and flexible symbols or slots, but not all downlink symbols or slots. A restricted use is a use (such as a transmission, reception, or configuration) of a resource that renders the resource unsuitable for reconfiguration to an SBFD format. In some aspects, the restricted use may include at least one of a synchronization signal block transmission (e.g., symbols or slots including a synchronization signal block transmission), a control resource set associated with a control channel for a system information block (e.g., symbols or slots including a control resource set (CORESET) zero), a common search space (CSS) control channel transmission (e.g., symbols or slots in which a CSS physical downlink control channel (PDCCH) is configured), a shared channel transmission scheduled via a common search space control channel transmission (e.g., symbols or slots in which a CSS-PDCCH scheduled physical downlink shared channel (PDSCH) is scheduled), a common reference signal transmission (e.g., a tracking reference signal (TRS) transmission), or a common semi-persistent scheduling (SPS transmission (such as for broadcasting a signal). Thus, negative impact on transmissions, receptions, and configurations of resources associated with restricted uses is reduced, thereby increasing throughput and reliability of communications.

As shown by reference number 740, in some aspects, the second configuration may configure an SBFD format in a resource having an uplink format. For example, the second configuration may explicitly change the resource's format to an SBFD format, or may configure a downlink sub-band in the resource. In some aspects, the second configuration may configure the SBFD format or the downlink sub-band in accordance with the condition. For example, the second configuration may configure the SBFD format or the downlink sub-band in the resource only if the condition indicates that the SBFD format or the downlink sub-band can be configured in the resource.

In some aspects, the condition indicates that resources configured in the uplink format, and not associated with a restricted use, can be configured to the SBFD format. For example, an SBFD format or a downlink sub-band may be allowed to be configured in some uplink resources but not all uplink resources. In this context (e.g., for resources configured in the uplink format), the restricted use may include at least one of a random access channel occasion, a sounding reference signal (SRS) transmission, or a physical uplink control channel (PUCCH) transmission. Thus, negative impact on transmissions, receptions, and configurations of resources associated with restricted uses is reduced, thereby increasing throughput and reliability of communications. In some aspects, the condition indicates that resources configured in the uplink format cannot be configured to the SBFD format. In this case, the network node may not configure a resource, in the uplink format, to the SBFD format or to include a downlink sub-band. Thus, stability of resources configured in the uplink format may be increased, which improves predictability of network traffic and configuration.

As shown by reference number 750, the network node may schedule a downlink transmission or an uplink transmission of the UE. For example, the network node may transmit DCI scheduling the downlink transmission or the uplink transmission.

In some aspects, the UE is not associated with an SBFD capability. Such a UE may be referred to as a legacy UE (relative to a ULE that is associated with an SBFD capability). In some aspects, the uplink transmission is permitted to be scheduled only in resources having the uplink format or the flexible format. In such aspects, for example, the uplink transmission may not be permitted to be scheduled in resources having the SBFD format (e.g., for UEs not associated with SBFD capabilities). Thus, legacy UEs (without an SBFD capability) may only be allowed to transmit uplink transmissions in uplink symbols or flexible symbols, not in SBFD symbols.

In some aspects, for a ULE that is not associated with an SBFD capability (e.g., a legacy UE), the uplink transmission is permitted to be scheduled in an uplink sub-band of a resource having an SBFD format (e.g., only in the uplink sub-band). For example, a legacy UE may be allowed to transmit uplink transmissions in SBFD resources, with SBFD operation at the network node, in an uplink sub-band only. Thus, the network node can implement SBFD communication in an SBFD resource for legacy UEs performing one-directional communication, which improves resource utilization at the network node and compatibility with legacy UEs.

In some aspects, for a ULE that is not associated with an SBFD capability (e.g., a legacy UE), the downlink transmission is permitted to be scheduled only in resources having the downlink format or the flexible format. For example, the downlink transmission may not be permitted to be scheduled in resources having the SBFD format. Thus, a legacy UE can be scheduled to receive downlink transmissions only in downlink or flexible resources, not in SBFD resources.

In some aspects, for a ULE that is not associated with an SBFD capability (e.g., a legacy UE), the downlink transmission is permitted to be scheduled in a downlink sub-band of the resource having the SBFD format. For example, a legacy UE may be allowed to receive a downlink transmission in an SBFD resource, with SBFD operation at the network node, in a downlink sub-band only. Thus, the network node can implement SBFD communication in an SBFD resource for legacy UEs performing one-directional communication, which improves resource utilization at the network node and compatibility with legacy UEs.

As shown by reference number 760, the UE and the network node may perform the downlink transmission or the uplink transmission. For example, the UE may transmit, and the network node may receive, the uplink transmission. As another example, the network node may transmit, and the UE may receive, the downlink transmission.

As shown by reference number 770, in some aspects, the network node may output a third configuration. The third configuration may configure a resource, or a sub-band of a resource, from the SBFD format to another format based at least in part on the one or more resources satisfying a condition. As described above, the condition may define one or more rules for reconfiguring a resource or a sub-band of a resource from a first format (or sub-band) to a second format (or sub-band). The third configuration may be a cell common configuration, an SFI based configuration, or a UE-dedicated configuration.

As shown by reference number 780, in some aspects, the third configuration may configure the resource, configured by the second configuration with an SBFD format, to have a downlink format, an uplink format, or a flexible format. Configuring a resource with an SBFD format to have a downlink format, an uplink format, or a flexible format, may be referred to as "falling back" to the downlink format, the uplink format, or the flexible format. The third configuration may configure the resource in accordance with the condition described above in connection with reference number 720. Particular examples of the condition are provided below.

In some aspects, the condition indicates that the resource having the SBFD format is not permitted to be reconfigured to the downlink format, the uplink format, or the flexible format. For example, an SBFD resource may not be allowed to fall back to a downlink format, an uplink format, or a flexible format. In this example, the network node may not transmit a third configuration reconfiguring an SBFD resource as a downlink resource, an uplink resource, or a flexible resource.

In some aspects, the condition indicates that the resource having the SBFD format is not permitted to be reconfigured to the downlink format, the uplink format or the flexible format based at least in part on whether the second configuration is a UE-dedicated configuration, a slot format indication based configuration, or a cell common configuration. For example, the condition may indicate whether or not a resource having the SBFD format as configured by a UE-dedicated configuration (e.g., RRC signaling specific to the UE) is permitted to be reconfigured to the downlink format, the uplink format, or the flexible format. Additionally, or alternatively, the condition may indicate whether or not a resource having the SBFD format as configured by an SFI is permitted to be reconfigured to the downlink format, the uplink format, or the flexible format. Additionally, or alternatively, the condition may indicate whether or not a resource having the SBFD format as configured by a cell common configuration is permitted to be reconfigured to the downlink format, the uplink format, or the flexible format.

In some aspects, the third configuration may reconfigure the resource having the SBFD format to at least one of the downlink format, the uplink format, or the flexible format. For example, the third configuration may include an indication to reconfigure the resource having the SBFD format. In some aspects, the condition may indicate that a resource having the SBFD format is allowed to be reconfigured to the downlink format. In some aspects, the condition may indicate that a resource having the SBFD format is allowed to be reconfigured to the uplink format. In some aspects, the condition may indicate that a resource having the SBFD format is allowed to be reconfigured to the flexible format. In some aspects, the condition may indicate that a resource having the SBFD format can be reconfigured to any of a downlink format, an uplink format, or a flexible format.

In some aspects, the condition may indicate whether a resource associated with an SBFD format can be reconfigured based at least in part on whether the second configuration (e.g., a configuration of the resource as associated with the SBFD format) is a UE-dedicated configuration, an SFI based configuration, or a cell common configuration. For example, the condition may indicate that a resource having the SBFD format as configured by a UE-dedicated configuration is permitted to be reconfigured to the downlink format, the uplink format, and/or the flexible format. Additionally, or alternatively, the condition may indicate that a resource having the SBFD format as configured by an SFI is permitted to be reconfigured to the downlink format, the uplink format, and/or the flexible format. Additionally, or alternatively, the condition may indicate that a resource having the SBFD format as configured by a cell common configuration is permitted to be reconfigured to the downlink format, the uplink format, and/or the flexible format.

As shown by reference number 790, in some aspects, the second configuration may configure a sub-band of the resource, configured by the second configuration with an SBFD format, to be a downlink sub-band, an uplink sub-band, or a flexible sub-band. The third configuration may configure the resource in accordance with the condition described above in connection with reference number 720. Particular examples of the condition, relating to reconfiguration of sub-bands of a resource with an SBFD format, are provided below.

In some aspects, the condition indicates that a sub-band of the resource having the SBFD format is not permitted to be reconfigured to any of a downlink sub-band, an uplink sub-band, or a flexible sub-band. In this example, the network node may not reconfigure the sub-band of the resource having the SBFD format to be a downlink sub-band, an uplink sub-band, or a flexible sub-band. In some aspects, the condition may indicate that an uplink sub-band of the resource in the SBFD format is not permitted to be reconfigured to a downlink sub-band. Additionally, or alternatively, the condition may indicate that a downlink sub-band of the resource in the SBFD format is not permitted to be reconfigured to an uplink sub-band. Additionally, or alternatively, the condition may indicate that a downlink sub-band or an uplink sub-band of the resource in the SBFD format is not permitted to be reconfigured to a flexible sub-band. Additionally, or alternatively, the condition may indicate that a downlink or uplink sub-band of the resource in the SBFD format is permitted to be reconfigured to a flexible sub-band, a downlink sub-band, or an uplink sub-band.

In some aspects, the condition (as described with respect to reconfiguration of sub-bands of an SBFD resource) indicates whether or not a sub-band is permitted to be reconfigured to at least one of the downlink sub-band, the uplink sub-band, or the flexible sub-band based at least in part on whether the second configuration is a UE-dedicated configuration, a slot format indication based configuration, or a cell common configuration. For example, the condition may indicate whether or not a sub-band of a resource having the SBFD format as configured by a UE-dedicated configuration is permitted to be reconfigured to a downlink sub-band, an uplink sub-band, and/or a flexible sub-band. Additionally, or alternatively, the condition may indicate whether or not a sub-band of a resource having the SBFD format as configured by an SFI is permitted to be reconfigured to a downlink sub-band, an uplink sub-band, and/or a flexible sub-band. Additionally, or alternatively, the condition may indicate whether or not a sub-band of a resource having the SBFD format as configured by a cell common configuration is permitted to be reconfigured to a downlink sub-band, an uplink sub-band, and/or a flexible sub-band.

As shown by reference number 795, the UE and the network node may communicate on the one or more resources. For example, the UE may transmit, and the network node may receive, an uplink transmission if the resource is configured as an uplink resource, or if the UE is scheduled to transmit the uplink transmission on an uplink sub-band of the resource. As another example, the network node may transmit, and the UE may receive, a downlink transmission if the resource is configured as a downlink resource, or if the UE is scheduled to receive the downlink transmission on a downlink sub-band of the resource.

As indicated above, FIG. 7 is provided as an example. Other examples may differ from what is described with regard to FIG. 7.

Figure 8:
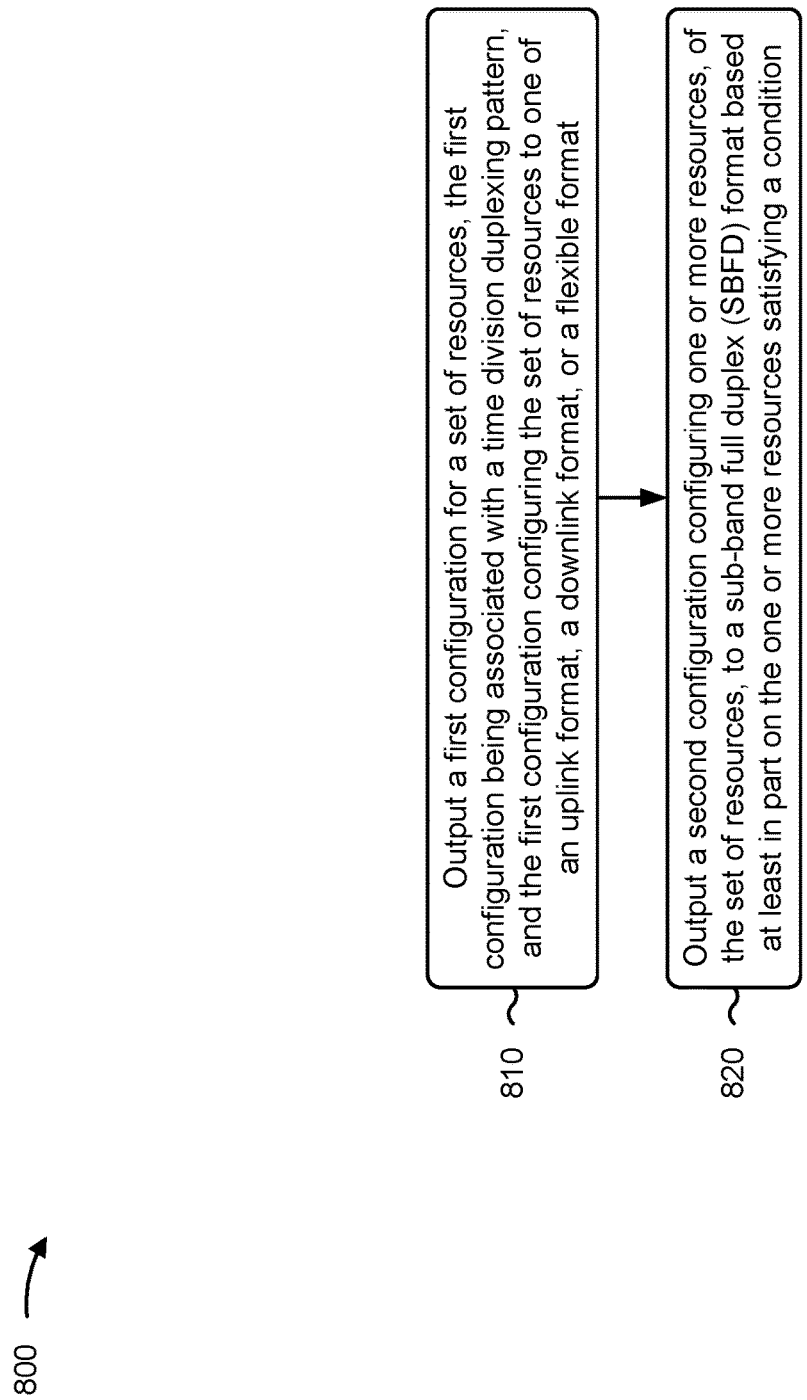
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110, a CU, a DU, an RU, or a combination thereof) performs operations associated with sub-band full duplex resource configuration.

As shown in FIG. 8, in some aspects, process 800 may include outputting a first configuration for a set of resources, the first configuration being associated with a time division duplexing pattern, and the first configuration configuring the set of resources to one of an uplink format, a downlink format, or a flexible format (block 810). For example, the network node (e.g., using communication manager 150 and/or configuration component 1008, depicted in FIG. 10) may output a first configuration for a set of resources, the first configuration being associated with a time division duplexing pattern, and the first configuration configuring the set of resources to one of an uplink format, a downlink format, or a flexible format, as described above.

As further shown in FIG. 8, in some aspects, process 800 may include outputting a second configuration configuring one or more resources, of the set of resources, to an SBFD format based at least in part on the one or more resources satisfying a condition (block 820). For example, the network node (e.g., using communication manager 150 and/or configuration component 1008, depicted in FIG. 10) may output a second configuration configuring one or more resources, of the set of resources, to an SBFD format based at least in part on the one or more resources satisfying a condition, as described above.

Process 800 may include additional aspects, such as any single aspect or any combination of aspects described below and/or in connection with one or more other processes described elsewhere herein.

In a first aspect, the SBFD format includes at least one downlink sub-band and at least one uplink sub-band in a same symbol.

In a second aspect, alone or in combination with the first aspect, the condition indicates that any resource configured in the flexible format or the downlink format can be configured to the SBFD format.

In a third aspect, alone or in combination with one or more of the first and second aspects, the condition indicates that resources configured in the flexible format or the downlink format, and not associated with a restricted use, can be configured to the SBFD format.

In a fourth aspect, alone or in combination with one or more of the first through third aspects, the restricted use includes at least one of a synchronization signal block transmission, a control resource set associated with a control channel for a system information block, a common search space control channel transmission, a shared channel transmission scheduled via a common search space control channel transmission, a common reference signal transmission, or a common semi-persistent scheduling transmission.

In a fifth aspect, alone or in combination with one or more of the first through fourth aspects, the condition indicates that resources configured in the uplink format cannot be configured to the SBFD format.

In a sixth aspect, alone or in combination with one or more of the first through fifth aspects, the condition indicates that resources configured in the uplink format, and not associated with a restricted use, can be configured to the SBFD format.

In a seventh aspect, alone or in combination with one or more of the first through sixth aspects, the restricted use includes at least one of a random access channel occasion, a sounding reference signal transmission, or a physical uplink control channel transmission.

In an eighth aspect, alone or in combination with one or more of the first through seventh aspects, process 800 includes scheduling an uplink transmission of a UE that is not associated with an SBFD capability, wherein the uplink transmission is permitted to be scheduled only in resources having the uplink format or the flexible format.

In a ninth aspect, alone or in combination with one or more of the first through eighth aspects, the uplink transmission is not permitted to be scheduled in resources having the SBFD format.

In a tenth aspect, alone or in combination with one or more of the first through ninth aspects, process 800 includes scheduling an uplink transmission of a UE that is not associated with an SBFD capability, wherein the uplink transmission is permitted to be scheduled in an uplink sub-band of the resource having the SBFD format.

In an eleventh aspect, alone or in combination with one or more of the first through tenth aspects, process 800 includes scheduling a downlink transmission of a UE that is not associated with an SBFD capability, wherein the downlink transmission is permitted to be scheduled only in resources having the downlink format or the flexible format.

In a twelfth aspect, alone or in combination with one or more of the first through eleventh aspects, the downlink transmission is not permitted to be scheduled in resources having the SBFD format.

In a thirteenth aspect, alone or in combination with one or more of the first through twelfth aspects, process 800 includes scheduling a downlink transmission of a UE that is not associated with an SBFD capability, wherein the downlink transmission is permitted to be scheduled in a downlink sub-band of the resource having the SBFD format.

In a fourteenth aspect, alone or in combination with one or more of the first through thirteenth aspects, the condition indicates that the resource having the SBFD format is not permitted to be reconfigured to the downlink format, the uplink format or the flexible format.

In a fifteenth aspect, alone or in combination with one or more of the first through fourteenth aspects, the condition indicates that the resource having the SBFD format is not permitted to be reconfigured to the downlink format, the uplink format or the flexible format based at least in part on whether the second configuration is a UE-dedicated configuration, a slot format indication based configuration, or a cell common configuration.

In a sixteenth aspect, alone or in combination with one or more of the first through fifteenth aspects, process 800 includes transmitting an indication to reconfigure the resource having the SBFD format to at least one of the downlink format, the uplink format, or the flexible format.

In a seventeenth aspect, alone or in combination with one or more of the first through sixteenth aspects, reconfiguring the resource is based at least in part on whether the second configuration is a UE-dedicated configuration, a slot format indication based configuration, or a cell common configuration.

In an eighteenth aspect, alone or in combination with one or more of the first through seventeenth aspects, the condition indicates that a sub-band of the resource having the SBFD format is not permitted to be reconfigured to at least one of a downlink sub-band, an uplink sub-band, or a flexible sub-band.

In a nineteenth aspect, alone or in combination with one or more of the first through eighteenth aspects, the condition indicates that the sub-band is not permitted to be reconfigured to at least one of the downlink sub-band, the uplink sub-band, or the flexible sub-band based at least in part on whether the second configuration is a UE-dedicated configuration, a slot format indication based configuration, or a cell common configuration.

In a twentieth aspect, alone or in combination with one or more of the first through nineteenth aspects, the condition indicates that an uplink sub-band of the resource in the SBFD format is not permitted to be reconfigured to a downlink sub-band.

In a twenty-first aspect, alone or in combination with one or more of the first through twentieth aspects, the condition indicates that a downlink sub-band of the resource in the SBFD format is not permitted to be reconfigured to an uplink sub-band.

In a twenty-second aspect, alone or in combination with one or more of the first through twenty-first aspects, the condition indicates that a downlink or uplink sub-band of the resource in the SBFD format is not permitted to be reconfigured to a flexible sub-band.

In a twenty-third aspect, alone or in combination with one or more of the first through twenty-second aspects, the condition indicates that a downlink or uplink sub-band of the resource in the SBFD format is permitted to be reconfigured to a flexible sub-band, a downlink sub-band, or an uplink sub-band.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
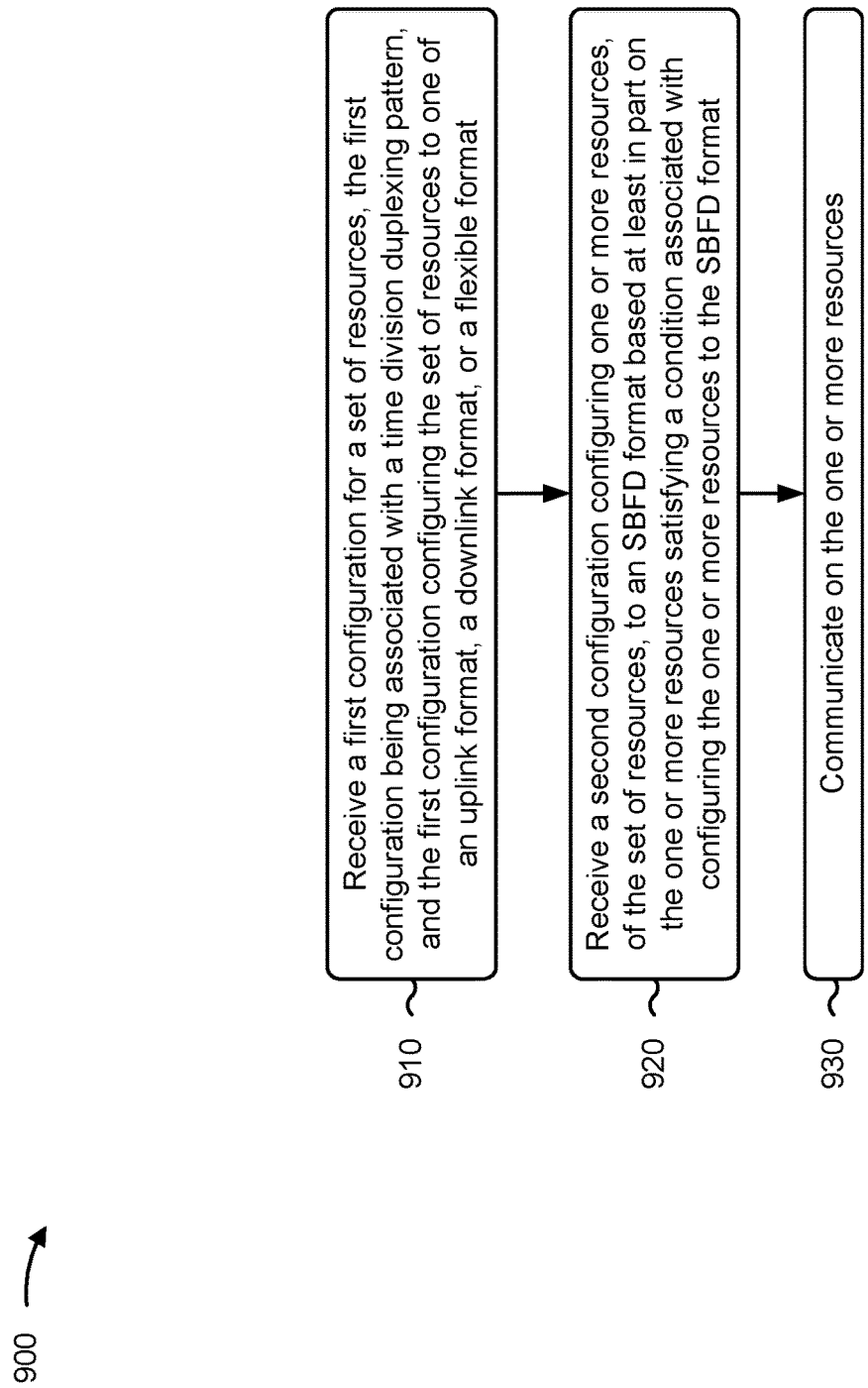
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with sub-band full duplex resource configuration.

As shown in FIG. 9, in some aspects, process 900 may include receiving a first configuration for a set of resources, the first configuration being associated with a time division duplexing pattern, and the first configuration configuring the set of resources to one of an uplink format, a downlink format, or a flexible format (block 910). For example, the UE (e.g., using communication manager 140 and/or reception component 1102, depicted in FIG. 11) may receive a first configuration for a set of resources, the first configuration being associated with a time division duplexing pattern, and the first configuration configuring the set of resources to one of an uplink format, a downlink format, or a flexible format, as described above.

As further shown in FIG. 9, in some aspects, process 900 may include receiving a second configuration configuring one or more resources, of the set of resources, to an SBFD format based at least in part on the one or more resources satisfying a condition associated with configuring the one or more resources to the SBFD format (block 920). For example, the UE (e.g., using communication manager 140 and/or reception component 1102, depicted in FIG. 1) may receive a second configuration configuring one or more resources, of the set of resources, to an SBFD format based at least in part on the one or more resources satisfying a condition associated with configuring the one or more resources to the SBFD format, as described above.

As further shown in FIG. 9, in some aspects, process 900 may include communicating on the one or more resources (block 930). For example, the UE (e.g., using communication manager 140 and/or transmission component 1104 or reception component 1102, depicted in FIG. 11) may communicate on the one or more resources, as described above.

Process 900 may include additional aspects, such as any single aspect or any combination of aspects described below and/or in connection with one or more other processes described elsewhere herein.

In a first aspect, the SBFD format includes at least one downlink sub-band and at least one uplink sub-band in a same symbol.

In a second aspect, alone or in combination with the first aspect, the condition indicates that any resource configured in the flexible format or the downlink format can be configured to the SBFD format.

In a third aspect, alone or in combination with one or more of the first and second aspects, the condition indicates that resources configured in the flexible format or the downlink format, and not associated with a restricted use, can be configured to the SBFD format.

In a fourth aspect, alone or in combination with one or more of the first through third aspects, the restricted use includes at least one of a synchronization signal block transmission, a control resource set associated with a control channel for a system information block, a common search space control channel transmission, a shared channel transmission scheduled via a common search space control channel transmission, a common reference signal transmission, or a common semi-persistent scheduling transmission.

In a fifth aspect, alone or in combination with one or more of the first through fourth aspects, the condition indicates that resources configured in the uplink format cannot be configured to the SBFD format.

In a sixth aspect, alone or in combination with one or more of the first through fifth aspects, the condition indicates that resources configured in the uplink format, and not associated with a restricted use, can be configured to the SBFD format.

In a seventh aspect, alone or in combination with one or more of the first through sixth aspects, the restricted use includes at least one of a random access channel occasion, a sounding reference signal transmission, or a physical uplink control channel transmission.

In an eighth aspect, alone or in combination with one or more of the first through seventh aspects, process 900 includes receiving downlink control information scheduling an uplink transmission of the UE, wherein the UE is not associated with an SBFD capability, and wherein the uplink transmission is permitted to be scheduled only in resources having the uplink format or the flexible format.

In a ninth aspect, alone or in combination with one or more of the first through eighth aspects, the uplink transmission is not permitted to be scheduled in resources having the SBFD format.

In a tenth aspect, alone or in combination with one or more of the first through ninth aspects, process 900 includes receiving downlink control information scheduling an uplink transmission, wherein the UE is not associated with an SBFD capability, and wherein the uplink transmission is permitted to be scheduled in an uplink sub-band of the resource having the SBFD format.

In an eleventh aspect, alone or in combination with one or more of the first through tenth aspects, process 900 includes receiving downlink control information scheduling a downlink transmission, wherein the UE is not associated with an SBFD capability, and wherein the downlink transmission is permitted to be scheduled only in resources having the downlink format or the flexible format.

In a twelfth aspect, alone or in combination with one or more of the first through eleventh aspects, the downlink transmission is not permitted to be scheduled in resources having the SBFD format.

In a thirteenth aspect, alone or in combination with one or more of the first through twelfth aspects, process 900 includes receiving downlink control information scheduling a downlink transmission, wherein the UE is not associated with an SBFD capability, and wherein the downlink transmission is permitted to be scheduled in a downlink sub-band of the resource having the SBFD format.

In a fourteenth aspect, alone or in combination with one or more of the first through thirteenth aspects, the condition indicates that the resource having the SBFD format is not permitted to be reconfigured to the downlink format, the uplink format or the flexible format.

In a fifteenth aspect, alone or in combination with one or more of the first through fourteenth aspects, the condition indicates that the resource is not permitted to be reconfigured to the downlink format, the uplink format or the flexible format based at least in part on whether the second configuration is a UE-dedicated configuration, a slot format indication based configuration, or a cell common configuration.

In a sixteenth aspect, alone or in combination with one or more of the first through fifteenth aspects, process 900 includes receiving an indication to reconfigure the resource to at least one of the downlink format, the uplink format, or the flexible format.

In a seventeenth aspect, alone or in combination with one or more of the first through sixteenth aspects, the indication is based at least in part on whether the second configuration is a UE-dedicated configuration, a slot format indication based configuration, or a cell common configuration.

In an eighteenth aspect, alone or in combination with one or more of the first through seventeenth aspects, the condition indicates that a sub-band of the resource in the SBFD format is not permitted to be reconfigured to at least one of a downlink sub-band, an uplink sub-band, or a flexible sub-band.

In a nineteenth aspect, alone or in combination with one or more of the first through eighteenth aspects, the condition indicates that the sub-band is not permitted to be reconfigured to at least one of a downlink sub-band, an uplink sub-band, or a flexible sub-band based at least in part on whether the second configuration is a UE-dedicated configuration, a slot format indication based configuration, or a cell common configuration.

In a twentieth aspect, alone or in combination with one or more of the first through nineteenth aspects, the condition indicates that an uplink sub-band of the resource in the SBFD format is not permitted to be reconfigured to a downlink sub-band.

In a twenty-first aspect, alone or in combination with one or more of the first through twentieth aspects, the condition indicates that a downlink sub-band of the resource in the SBFD format is not permitted to be reconfigured to an uplink sub-band.

In a twenty-second aspect, alone or in combination with one or more of the first through twenty-first aspects, the condition indicates that a downlink or uplink sub-band of the resource in the SBFD format is not permitted to be reconfigured to a flexible sub-band.

In a twenty-third aspect, alone or in combination with one or more of the first through twenty-second aspects, the condition indicates that a downlink or uplink sub-band of the resource in the SBFD format is permitted to be reconfigured to a flexible sub-band, a downlink sub-band, or an uplink sub-band.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
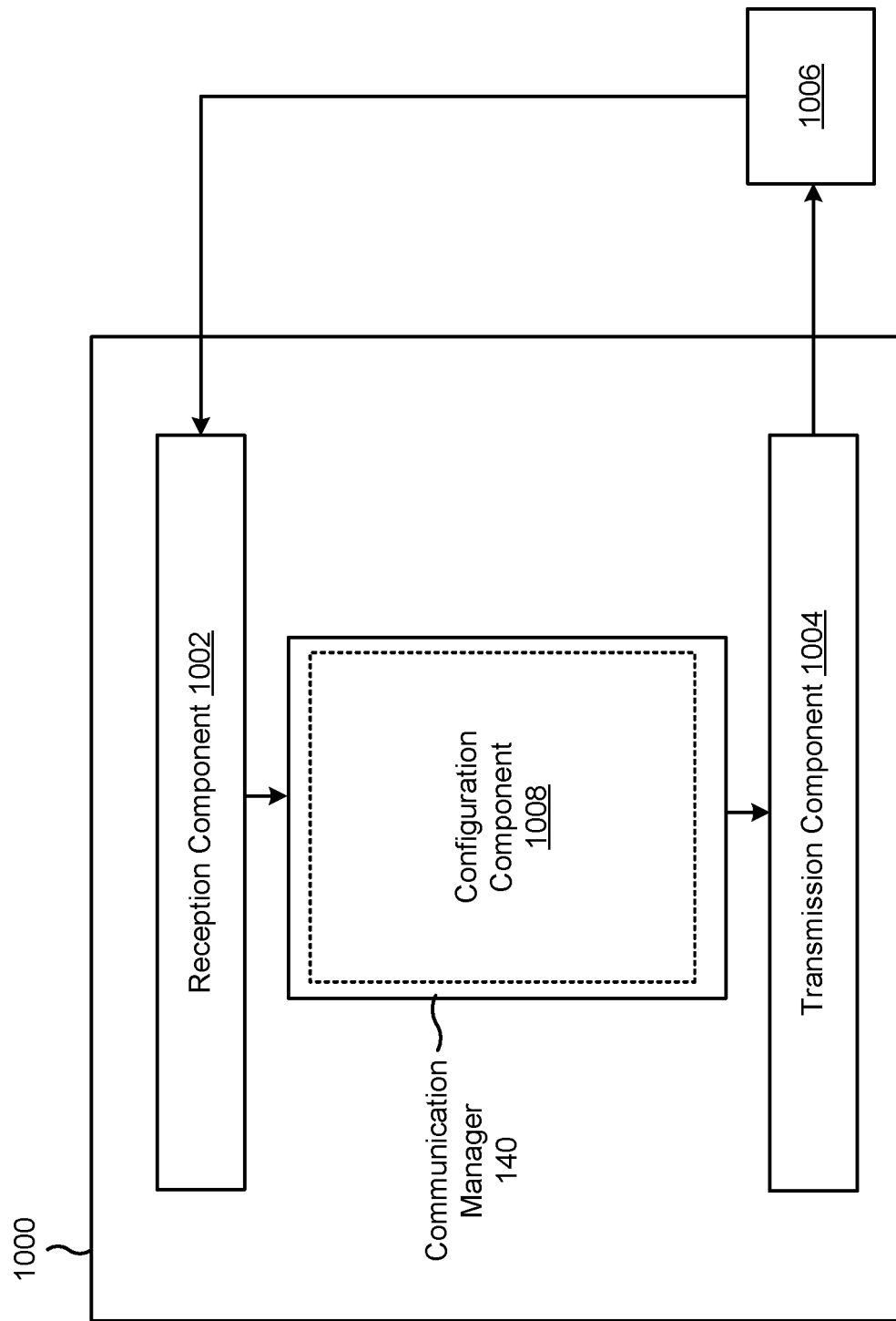
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a configuration component 1008, among other examples.

In some aspects, the apparatus 1000 may be configured to perform one or more operations described herein in connection with FIGS. 3-11. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The configuration component 1008 may output a first configuration for a set of resources, the first configuration being associated with a time division duplexing pattern, and the first configuration configuring the set of resources to one of an uplink format, a downlink format, or a flexible format. The configuration component 1008 may output a second configuration configuring one or more resources, of the set of resources, to an SBFD format based at least in part on the one or more resources satisfying a condition.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
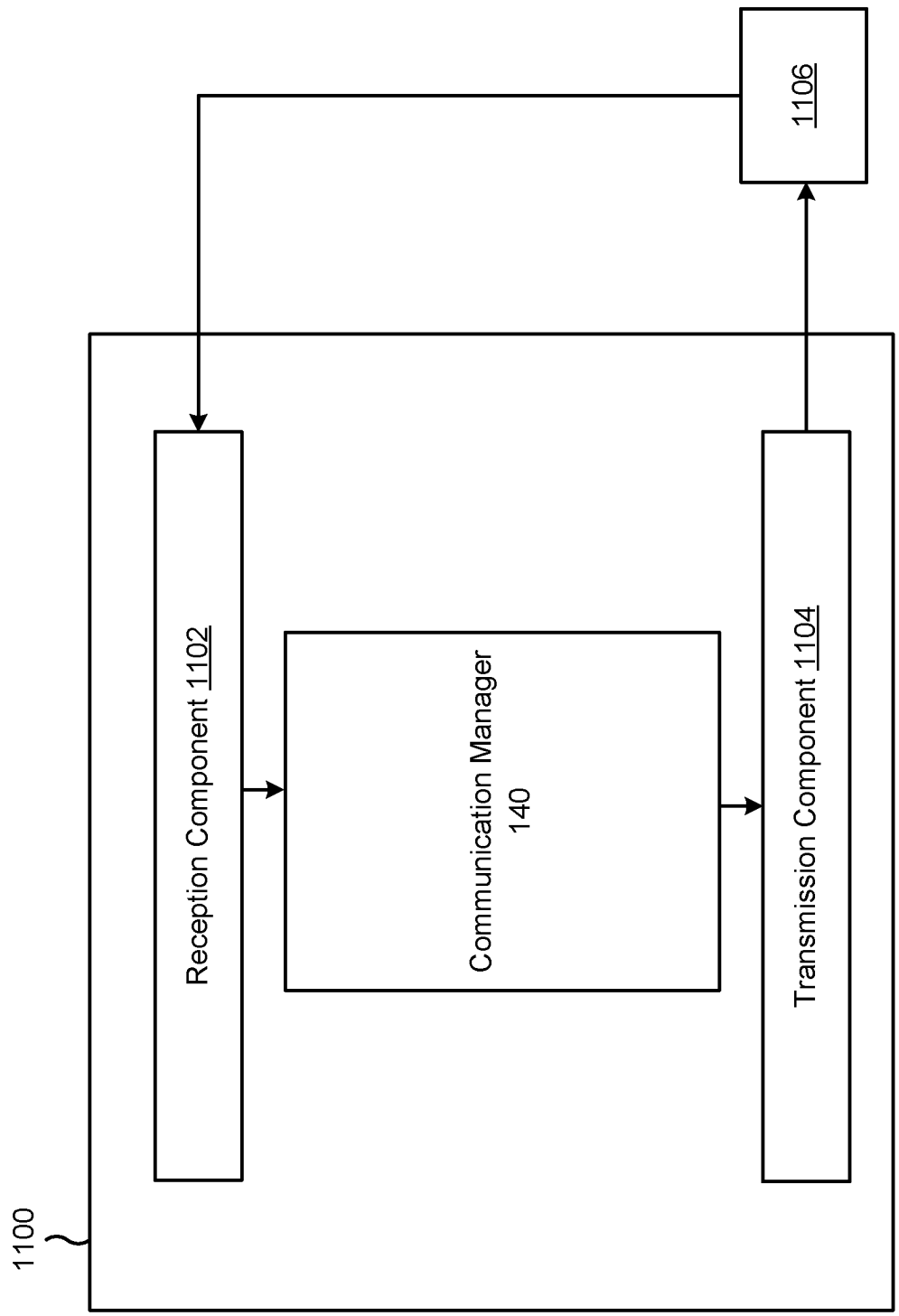
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140.

In some aspects, the apparatus 1100 may be configured to perform one or more operations described herein in connection with FIGS. 3-11. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive a first configuration for a set of resources, the first configuration being associated with a time division duplexing pattern, and the first configuration configuring the set of resources to one of an uplink format, a downlink format, or a flexible format. The reception component 1102 may receive a second configuration configuring one or more resources, of the set of resources, to an SBFD format based at least in part on the one or more resources satisfying a condition associated with configuring the one or more resources to the SBFD format. The reception component 1102 or the transmission component 1104 may communicate on the one or more resources.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: outputting a first configuration for a set of resources, the first configuration being associated with a time division duplexing pattern, and the first configuration configuring the set of resources to one of an uplink format, a downlink format, or a flexible format; and outputting a second configuration configuring one or more resources, of the set of resources, to a sub-band full duplex (SBFD) format based at least in part on the one or more resources satisfying a condition.

Aspect 2: The method of Aspect 1, wherein the SBFD format includes at least one downlink sub-band and at least one uplink sub-band in a same symbol.

Aspect 3: The method of any of Aspects 1-2, wherein the condition indicates that any resource configured in the flexible format or the downlink format can be configured to the SBFD format.

Aspect 4: The method of any of Aspects 1-3, wherein the condition indicates that resources configured in the flexible format or the downlink format, and not associated with a restricted use, can be configured to the SBFD format.

Aspect 5: The method of Aspect 4, wherein the restricted use includes at least one of: a synchronization signal block transmission, a control resource set associated with a control channel for a system information block, a common search space control channel transmission, a shared channel transmission scheduled via a common search space control channel transmission, a common reference signal transmission, or a common semi-persistent scheduling transmission.

Aspect 6: The method of any of Aspects 1-5, wherein the condition indicates that resources configured in the uplink format cannot be configured to the SBFD format.

Aspect 7: The method of any of Aspects 1-6, wherein the condition indicates that resources configured in the uplink format, and not associated with a restricted use, can be configured to the SBFD format.

Aspect 8: The method of Aspect 7, wherein the restricted use includes at least one of: a random access channel occasion, a sounding reference signal transmission, or a physical uplink control channel transmission.

Aspect 9: The method of any of Aspects 1-8, further comprising: scheduling an uplink transmission of a user equipment that is not associated with an SBFD capability, wherein the uplink transmission is permitted to be scheduled only in resources having the uplink format or the flexible format.

Aspect 10: The method of Aspect 9, wherein the uplink transmission is not permitted to be scheduled in resources having the SBFD format.

Aspect 11: The method of any of Aspects 1-10, further comprising: scheduling an uplink transmission of a user equipment that is not associated with an SBFD capability, wherein the uplink transmission is permitted to be scheduled in an uplink sub-band of the resource having the SBFD format.

Aspect 12: The method of any of Aspects 1-11, further comprising: scheduling a downlink transmission of a user equipment that is not associated with an SBFD capability, wherein the downlink transmission is permitted to be scheduled only in resources having the downlink format or the flexible format.

Aspect 13: The method of Aspect 12, wherein the downlink transmission is not permitted to be scheduled in resources having the SBFD format.

Aspect 14: The method of any of Aspects 1-11, further comprising: scheduling a downlink transmission of a user equipment that is not associated with an SBFD capability, wherein the downlink transmission is permitted to be scheduled in a downlink sub-band of the resource having the SBFD format.

Aspect 15: The method of any of Aspects 1-14, wherein the condition indicates that the resource having the SBFD format is not permitted to be reconfigured to the downlink format, the uplink format or the flexible format.

Aspect 16: The method of Aspect 15, wherein the condition indicates that the resource having the SBFD format is not permitted to be reconfigured to the downlink format, the uplink format or the flexible format based at least in part on whether the second configuration is a user equipment dedicated configuration, a slot format indication based configuration, or a cell common configuration.

Aspect 17: The method of any of Aspects 1-16, further comprising transmitting an indication to reconfigure the resource having the SBFD format to at least one of: the downlink format, the uplink format, or the flexible format.

Aspect 18: The method of Aspect 13, wherein reconfiguring the resource is based at least in part on whether the second configuration is a user equipment dedicated configuration, a slot format indication based configuration, or a cell common configuration.

Aspect 19: The method of any of Aspects 1-18, wherein the condition indicates that a sub-band of the resource having the SBFD format is not permitted to be reconfigured to at least one of a downlink sub-band, an uplink sub-band, or a flexible sub-band.

Aspect 20: The method of Aspect 17, wherein the condition indicates that the sub-band is not permitted to be reconfigured to at least one of the downlink sub-band, the uplink sub-band, or the flexible sub-band based at least in part on whether the second configuration is a user equipment dedicated configuration, a slot format indication based configuration, or a cell common configuration.

Aspect 21: The method of any of Aspects 1-20, wherein the condition indicates that an uplink sub-band of the resource in the SBFD format is not permitted to be reconfigured to a downlink sub-band.

Aspect 22: The method of any of Aspects 1-21, wherein the condition indicates that a downlink sub-band of the resource in the SBFD format is not permitted to be reconfigured to an uplink sub-band.

Aspect 23: The method of any of Aspects 1-22, wherein the condition indicates that a downlink or uplink sub-band of the resource in the SBFD format is not permitted to be reconfigured to a flexible sub-band.

Aspect 24: The method of any of Aspects 1-23, wherein the condition indicates that a downlink or uplink sub-band of the resource in the SBFD format is permitted to be reconfigured to a flexible sub-band, a downlink sub-band, or an uplink sub-band.

Aspect 25: A method of wireless communication performed by a user equipment (UE), comprising: receiving a first configuration for a set of resources, the first configuration being associated with a time division duplexing pattern, and the first configuration configuring the set of resources to one of an uplink format, a downlink format, or a flexible format; receiving a second configuration configuring one or more resources, of the set of resources, to a sub-band full duplex (SBFD) format based at least in part on the one or more resources satisfying a condition associated with configuring the one or more resources to the SBFD format; and communicating on the one or more resources.

Aspect 26: The method of Aspect 25, wherein the SBFD format includes at least one downlink sub-band and at least one uplink sub-band in a same symbol.

Aspect 27: The method of any of Aspects 25-26, wherein the condition indicates that any resource configured in the flexible format or the downlink format can be configured to the SBFD format.

Aspect 28: The method of any of Aspects 25-27, wherein the condition indicates that resources configured in the flexible format or the downlink format, and not associated with a restricted use, can be configured to the SBFD format.

Aspect 29: The method of Aspect 28, wherein the restricted use includes at least one of: a synchronization signal block transmission, a control resource set associated with a control channel for a system information block, a common search space control channel transmission, a shared channel transmission scheduled via a common search space control channel transmission, a common reference signal transmission, or a common semi-persistent scheduling transmission.

Aspect 30: The method of any of Aspects 25-29, wherein the condition indicates that resources configured in the uplink format cannot be configured to the SBFD format.

Aspect 31: The method of any of Aspects 25-30, wherein the condition indicates that resources configured in the uplink format, and not associated with a restricted use, can be configured to the SBFD format.

Aspect 32: The method of Aspect 31, wherein the restricted use includes at least one of: a random access channel occasion, a sounding reference signal transmission, or a physical uplink control channel transmission.

Aspect 33: The method of any of Aspects 25-32, further comprising: receiving downlink control information scheduling an uplink transmission of the UE, wherein the UE is not associated with an SBFD capability, and wherein the uplink transmission is permitted to be scheduled only in resources having the uplink format or the flexible format.

Aspect 34: The method of Aspect 33, wherein the uplink transmission is not permitted to be scheduled in resources having the SBFD format.

Aspect 35: The method of any of Aspects 25-34, further comprising: receiving downlink control information scheduling an uplink transmission, wherein the UE is not associated with an SBFD capability, and wherein the uplink transmission is permitted to be scheduled in an uplink sub-band of the resource having the SBFD format.

Aspect 36: The method of any of Aspects 25-35, further comprising: receiving downlink control information scheduling a downlink transmission, wherein the UE is not associated with an SBFD capability, and wherein the downlink transmission is permitted to be scheduled only in resources having the downlink format or the flexible format.

Aspect 37: The method of Aspect 36, wherein the downlink transmission is not permitted to be scheduled in resources having the SBFD format.

Aspect 38: The method of any of Aspects 25-37, further comprising: receiving downlink control information scheduling a downlink transmission, wherein the UE is not associated with an SBFD capability, and wherein the downlink transmission is permitted to be scheduled in a downlink sub-band of the resource having the SBFD format.

Aspect 39: The method of any of Aspects 25-38, wherein the condition indicates that the resource having the SBFD format is not permitted to be reconfigured to the downlink format, the uplink format or the flexible format.

Aspect 40: The method of Aspect 39, wherein the condition indicates that the resource is not permitted to be reconfigured to the downlink format, the uplink format or the flexible format based at least in part on whether the second configuration is a UE-dedicated configuration, a slot format indication based configuration, or a cell common configuration.

Aspect 41: The method of any of Aspects 25-40, further comprising receiving an indication to reconfigure the resource to at least one of: the downlink format, the uplink format, or the flexible format.

Aspect 42: The method of Aspect 41, wherein the indication is based at least in part on whether the second configuration is a UE-dedicated configuration, a slot format indication based configuration, or a cell common configuration.

Aspect 43: The method of any of Aspects 25-42, wherein the condition indicates that a sub-band of the resource in the SBFD format is not permitted to be reconfigured to at least one of a downlink sub-band, an uplink sub-band, or a flexible sub-band.

Aspect 44: The method of Aspect 43, wherein the condition indicates that the sub-band is not permitted to be reconfigured to at least one of a downlink sub-band, an uplink sub-band, or a flexible sub-band based at least in part on whether the second configuration is a UE-dedicated configuration, a slot format indication based configuration, or a cell common configuration.

Aspect 45: The method of any of Aspects 25-44, wherein the condition indicates that an uplink sub-band of the resource in the SBFD format is not permitted to be reconfigured to a downlink sub-band.

Aspect 46: The method of any of Aspects 25-45, wherein the condition indicates that a downlink sub-band of the resource in the SBFD format is not permitted to be reconfigured to an uplink sub-band.

Aspect 47: The method of any of Aspects 25-46, wherein the condition indicates that a downlink or uplink sub-band of the resource in the SBFD format is not permitted to be reconfigured to a flexible sub-band.

Aspect 48: The method of any of Aspects 25-47, wherein the condition indicates that a downlink or uplink sub-band of the resource in the SBFD format is permitted to be reconfigured to a flexible sub-band, a downlink sub-band, or an uplink sub-band.

Aspect 49: An apparatus for wireless communication at a device, comprising a processor; memory coupled with the processor; and instructions stored in the memory and executable by the processor to cause the apparatus to perform the method of one or more of Aspects 1-48.

Aspect 50: A device for wireless communication, comprising a memory and one or more processors coupled to the memory, the one or more processors configured to perform the method of one or more of Aspects 1-48.

Aspect 51: An apparatus for wireless communication, comprising at least one means for performing the method of one or more of Aspects 1-48.

Aspect 52: A non-transitory computer-readable medium storing code for wireless communication, the code comprising instructions executable by a processor to perform the method of one or more of Aspects 1-48.

Aspect 53: A non-transitory computer-readable medium storing a set of instructions for wireless communication, the set of instructions comprising one or more instructions that, when executed by one or more processors of a device, cause the device to perform the method of one or more of Aspects 1-48.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
   a memory; and
   one or more processors, coupled to the memory, configured to:
   output a first configuration that configures a resource, of a set of resources, to a sub-band full duplex (SBFD) format; and
   output a second configuration that reconfigures one or more resources, of the set of resources, based at least in part on the one or more resources satisfying a condition,
   wherein the condition indicates that the resource with the SBFD format is not permitted to be reconfigured to a downlink format, an uplink format, or a flexible format based at least in part on the resource with the SBFD format being configured by a cell configuration.

2. The network node of claim 1, wherein the SBFD format includes at least one downlink sub-band and at least one uplink sub-band in a same symbol.

3. The network node of claim 1, wherein the condition indicates that any resource configured in the flexible format or the downlink format can be configured to the SBFD format.

4. The network node of claim 1, wherein the condition indicates that resources configured in the flexible format or the downlink format, and not associated with a restricted use, can be configured to the SBFD format.

5. The network node of claim 4, wherein the restricted use includes at least one of:
   a synchronization signal block transmission,
   a control resource set associated with a control channel for a system information block,
   a common search space control channel transmission,
   a shared channel transmission scheduled via a common search space control channel transmission,
   a common reference signal transmission, or
   a common semi-persistent scheduling transmission.

6. The network node of claim 1, wherein the condition indicates that resources configured in the uplink format cannot be configured to the SBFD format.

7. The network node of claim 1, wherein the condition indicates that resources configured in the uplink format, and not associated with a restricted use, can be configured to the SBFD format.

8. The network node of claim 7, wherein the restricted use includes at least one of:
   a random access channel occasion,
   a sounding reference signal transmission, or
   a physical uplink control channel transmission.

9. The network node of claim 1, wherein the one or more processors are further configured to:
   schedule an uplink transmission of a user equipment that is not associated with an SBFD capability, wherein the uplink transmission is permitted to be scheduled only in resources having the uplink format or the flexible format.

10. The network node of claim 1, wherein the one or more processors are further configured to:
    schedule an uplink transmission of a user equipment that is not associated with an SBFD capability, wherein the uplink transmission is permitted to be scheduled in an uplink sub-band of the one or more resources having the SBFD format.

11. The network node of claim 1, wherein the one or more processors are further configured to:
    schedule a downlink transmission of a user equipment that is not associated with an SBFD capability, wherein the downlink transmission is permitted to be scheduled only in resources having the downlink format or the flexible format.

12. The network node of claim 11, wherein the downlink transmission is not permitted to be scheduled in resources having the SBFD format.

13. The network node of claim 1, wherein the one or more processors are further configured to:

schedule a downlink transmission of a user equipment that is not associated with an SBFD capability, wherein the downlink transmission is permitted to be scheduled in a downlink sub-band of the one or more resources having the SBFD format.

14. The network node of claim 1, wherein the condition indicates that a sub-band of the one or more resources having the SBFD format is not permitted to be reconfigured to at least one of a downlink sub-band, an uplink sub-band, or a flexible sub-band.

15. The network node of claim 1, wherein the one or more processors are further configured to:
output a configuration, prior to the first configuration, that includes a dedicated configuration parameter that configures a time division duplexing (TDD) pattern for the set of resources,
wherein the first configuration reconfigures the resource from a format indicated by the TDD pattern to the SBFD format.

16. A user equipment (UE) for wireless communication, comprising:
a memory; and
one or more processors, coupled to the memory, configured to:
receive a first configuration that configures
a resource, of a set of resources, to a sub-band full duplex (SBFD) format;
receive a second configuration that reconfigures one or more resources, of the set of resources,
based at least in part on the one or more resources satisfying a condition,
wherein the condition indicates that the resource with the SBFD format is not permitted to be reconfigured to a downlink format, an uplink format, or a flexible format based at least in part on the resource with the SBFD format being configured by a cell configuration; and
communicate on the one or more resources.

17. The UE of claim 16, wherein the condition indicates that resources configured in the flexible format or the downlink format, and not associated with a restricted use, can be configured to the SBFD format.

18. The UE of claim 16, wherein the condition indicates that resources configured in the uplink format, and not associated with a restricted use, can be configured to the SBFD format.

19. The UE of claim 16, wherein the one or more processors are further configured to:
receive downlink control information scheduling an uplink transmission of the UE, wherein the UE is not associated with an SBFD capability, and wherein the uplink transmission is permitted to be scheduled only in resources having the uplink format or the flexible format.

20. The UE of claim 16, wherein the one or more processors are further configured to:
receive downlink control information scheduling an uplink transmission, wherein the UE is not associated with an SBFD capability, and wherein the uplink transmission is permitted to be scheduled in an uplink sub-band of the one or more resources having the SBFD format.

21. The UE of claim 16, wherein the one or more processors are further configured to:
receive downlink control information scheduling a downlink transmission, wherein the UE is not associated with an SBFD capability, and wherein the downlink transmission is permitted to be scheduled only in resources having the downlink format or the flexible format.

22. The UE of claim 16, wherein the one or more processors are further configured to:
receive downlink control information scheduling a downlink transmission, wherein the UE is not associated with an SBFD capability, and wherein the downlink transmission is permitted to be scheduled in a downlink sub-band of the one or more resources having the SBFD format.

23. The UE of claim 16, wherein the one or more processors are further configured to receive an indication to reconfigure the one or more resources to at least one of:
the downlink format,
the uplink format, or
the flexible format.

24. The UE of claim 16, wherein the one or more processors are further configured to:
receive a configuration, prior to the first configuration, that includes a dedicated configuration parameter that configures a time division duplexing (TDD) pattern for the set of resources,
wherein the first configuration reconfigures the resource from a format indicated by the TDD pattern to the SBFD format.

25. A method of wireless communication performed by a network node, comprising:
outputting a first configuration that configures
a resource, of a set of resources, to a sub-band full duplex (SBFD) format; and
outputting a second configuration that reconfigures one or more resources, of the set of resources,
based at least in part on the one or more resources satisfying a condition,
wherein the condition indicates that the resource with the SBFD format is not permitted to be reconfigured to a downlink format, an uplink format, or a flexible format based at least in part on the resource with the SBFD format being configured by a cell configuration.

26. The method of claim 25, wherein the SBFD format includes at least one downlink sub-band and at least one uplink sub-band in a same symbol.

27. The method of claim 25, wherein the condition indicates that any resource configured in the flexible format or the downlink format can be configured to the SBFD format.

28. The method of claim 25, further comprising:
outputting a configuration, prior to the first configuration, that includes a dedicated configuration parameter that configures a time division duplexing (TDD) pattern for the set of resources,
wherein the first configuration reconfigures the resource from a format indicated by the TDD pattern to the SBFD format.

29. A method of wireless communication performed by a user equipment (UE), comprising:
receiving a first configuration that configures
a resource, of a set of resources, to a sub-band full duplex (SBFD) format;
receive a second configuration that reconfigures one or more resources, of the set of resources,
based at least in part on the one or more resources satisfying a condition,
wherein the condition indicates that the resource with the SBFD format is not permitted to be reconfigured to a downlink format, an uplink format, or a flexible format based at least in part on the resource with the SBFD format being configured by a cell configuration; and communicating on the one or more resources.

30. The method of claim 29, wherein the condition indicates that resources configured in the flexible format or the downlink format, and not associated with a restricted use, can be configured to the SBFD format.

* * * * *